United States Patent
Haitani et al.

(10) Patent No.: US 9,665,597 B2
(45) Date of Patent: May 30, 2017

(54) METHOD AND SYSTEM FOR PROCESSING IMAGES USING TIME AND LOCATION FILTERS

(75) Inventors: Robert Y. Haitani, Menlo Park, CA (US); Richard Dellinger, San Jose, CA (US); Paul Chambers, San Jose, CA (US); Mitch Allen, Mountain View, CA (US); Matthew W. Crowley, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1126 days.

(21) Appl. No.: 11/726,709

(22) Filed: Mar. 22, 2007

(65) Prior Publication Data

US 2008/0133526 A1 Jun. 5, 2008

Related U.S. Application Data

(60) Provisional application No. 60/873,066, filed on Dec. 5, 2006.

(51) Int. Cl.
*G06F 17/30* (2006.01)
*G06F 7/00* (2006.01)

(52) U.S. Cl.
CPC .............................. *G06F 17/30265* (2013.01)

(58) Field of Classification Search
CPC ............................................... G06F 17/30265
USPC ................................................. 707/100, 769
See application file for complete search history.

(56) References Cited

U.S. PATENT DOCUMENTS

| | | | |
|---|---|---|---|
| 4,404,771 A | 9/1983 | Murase et al. | |
| 5,907,604 A | 5/1999 | Hsu | |
| 6,408,301 B1 * | 6/2002 | Patton et al. | 707/741 |
| 6,434,403 B1 | 8/2002 | Ausems et al. | |
| 6,510,325 B1 | 1/2003 | Mack, II et al. | |
| 6,593,972 B1 | 7/2003 | Johnson, Jr. | |
| 7,009,643 B2 * | 3/2006 | Nakamura et al. | 348/231.4 |
| 7,075,573 B2 | 7/2006 | Imaeda | |
| 7,146,188 B2 | 12/2006 | Deeds | |
| 7,194,273 B2 | 3/2007 | Vaudreuil | |
| 7,248,285 B2 | 7/2007 | Needham | |
| 7,284,921 B2 | 10/2007 | Lapstun et al. | |
| 7,286,255 B2 * | 10/2007 | Habuta et al. | 358/1.15 |
| 7,325,061 B2 * | 1/2008 | Haruki | 709/226 |
| 7,403,225 B2 * | 7/2008 | Singh | 348/231.5 |
| 7,509,347 B2 * | 3/2009 | Chambers | 707/104.1 |
| 7,599,960 B2 | 10/2009 | Yamamoto et al. | |
| 7,636,733 B1 * | 12/2009 | Rothmuller | G06F 17/30265 382/305 |
| 7,663,673 B2 | 2/2010 | Kurumisawa | |
| 7,843,581 B2 * | 11/2010 | Hill et al. | 358/1.15 |
| 2002/0101519 A1 | 8/2002 | Myers | |
| 2003/0184653 A1 | 10/2003 | Ohkubo | |

(Continued)

OTHER PUBLICATIONS

Platt, John C., "PhotoTOC: Automatic clustering for browsing personal photographs" 2002, Microsoft Technical Report, p. 1-21.*
Office Action for U.S. Appl. No. 11/726,712, mail date Nov. 13, 2009, 24 pages.
Office Action for U.S. Appl. No. 11/726,715, mail date Nov. 24, 2009, 14 pages.

(Continued)

*Primary Examiner* — Kuen Lu
(74) *Attorney, Agent, or Firm* — Paradice and Li LLP

(57) ABSTRACT

A device may process images (e.g. sort, group, file, e-mail, etc.) using various filters. The filters may relate to non-image data in the image files to be processed. The filters may include time and location filters.

30 Claims, 8 Drawing Sheets

(56) References Cited

U.S. PATENT DOCUMENTS

| | | | |
|---|---|---|---|
| 2003/0210806 A1* | 11/2003 | Yoichi | G08G 1/20 |
| | | | 382/104 |
| 2004/0021780 A1 | 2/2004 | Kogan | |
| 2004/0101752 A1* | 5/2004 | Oosawa et al. | 429/217 |
| 2004/0114042 A1 | 6/2004 | Paolini et al. | |
| 2004/0125150 A1* | 7/2004 | Adcock | G06Q 10/109 |
| | | | 715/810 |
| 2004/0145602 A1* | 7/2004 | Sun et al. | 345/720 |
| 2004/0145660 A1* | 7/2004 | Kusaka | 348/211.2 |
| 2004/0192343 A1 | 9/2004 | Toyama | |
| 2004/0201702 A1* | 10/2004 | White | 348/207.99 |
| 2004/0201740 A1* | 10/2004 | Nakamura | G06F 17/30265 |
| | | | 348/231.3 |
| 2005/0044100 A1* | 2/2005 | Hooper et al. | 707/102 |
| 2005/0050043 A1* | 3/2005 | Pyhalammi et al. | 707/6 |
| 2005/0240596 A1 | 10/2005 | Worthen et al. | |
| 2005/0261990 A1* | 11/2005 | Gocht | G06Q 30/02 |
| | | | 707/758 |
| 2006/0010395 A1* | 1/2006 | Aaltonen | G06F 3/0482 |
| | | | 715/779 |
| 2006/0114337 A1* | 6/2006 | Rothschild | 348/231.3 |
| 2006/0155761 A1* | 7/2006 | Van De Sluis et al. | 707/104.1 |
| 2007/0008321 A1* | 1/2007 | Gallagher | G06F 17/30265 |
| | | | 345/473 |
| 2007/0043748 A1* | 2/2007 | Bhalotia | G06F 17/30265 |
| 2007/0067295 A1* | 3/2007 | Parulski | G06F 17/30265 |
| 2007/0139546 A1* | 6/2007 | Baiping et al. | 348/333.01 |
| 2007/0198632 A1 | 8/2007 | Peart et al. | |
| 2007/0229549 A1* | 10/2007 | Dicke et al. | 345/676 |
| 2008/0037826 A1* | 2/2008 | Sundstrom et al. | 382/103 |
| 2008/0048890 A1* | 2/2008 | Sheha et al. | 340/995.1 |
| 2008/0049968 A1 | 2/2008 | Koch et al. | |
| 2008/0055263 A1* | 3/2008 | Lemay et al. | 345/173 |
| 2008/0129835 A1 | 6/2008 | Chambers et al. | |
| 2008/0133697 A1 | 6/2008 | Stewart et al. | |

OTHER PUBLICATIONS

Office Action for U.S. Appl. No. 11/726,712, mail date May 14, 2010, 27 pages.

Office Action for U.S. Appl. No. 11/726,715, mail date May 11, 2009, 15 pages.

Arrington, Michael, "Flickr Geo Tagging Now Live", available at http://www.techcrunch.com/2006/08/28/flickr-to-launch-geo-tagging/, Aug. 28, 2006 (17 pp.).

Ellison, Craig, "Navman Unveils GPS/Camera Combo", available at http://www.pcmag.com/article2/0,1895,1945433,00.asp, Apr. 3, 2006 (4 pp.).

engadgetH, "Ricoh announces "new" GPS-enabled digital camera", available at http://gps.engadget.com/2005/01/20/ricoh-announces-new-gps-enabled-digital-camera/, posted Jan. 20, 2005, 7:33 AM by Marc Perton, Filed under: Digital Cameras, GPS (8 pp.).

Eye-Fi, "Technology That Will Change the Way You Take Pictures", available at http://www.eye.fi/index.htm, available at least by Oct. 23, 2007 (1 p.).

GeoSpatial Experts, "GPS-Photo Link Software with the New Ricoh 500SE GPS Camera", website documents available at http://www.geospatialexperts.com/productstd.html, Copyright © 2001-2006 GeoSpatial Experts, LLC (14 pp.).

O'Reilly radar, "Digital camera+GPS=Flickr mapping heaven!", available at http://radar.oreilly.com/archives/2005/05/digital_camera.html, © 2005-2006, O'Reilly Media, Inc. (7 pp.).

Sprint®, "Sprint PCS® Service, Sprint Power Vision Smart Device Treo™ 700$_p$ by Palm", © 2006 Palm, Inc. (432 pp.).

StreetHive, pages from website available available at http://streethive.com/?referralId=2091&friendHash=hDo*dSDK, available at least by Oct. 23, 2007 (11 pp.).

Office Action for U.S. Appl. No. 11/726,712, mail date Aug. 31, 2010, 29 pages.

\* cited by examiner

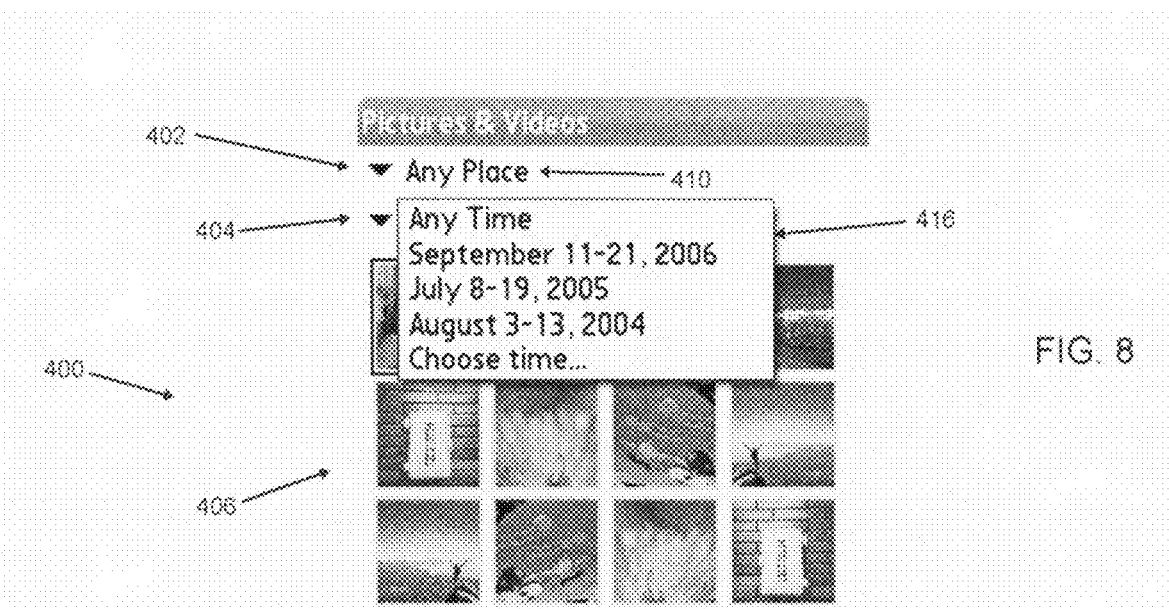

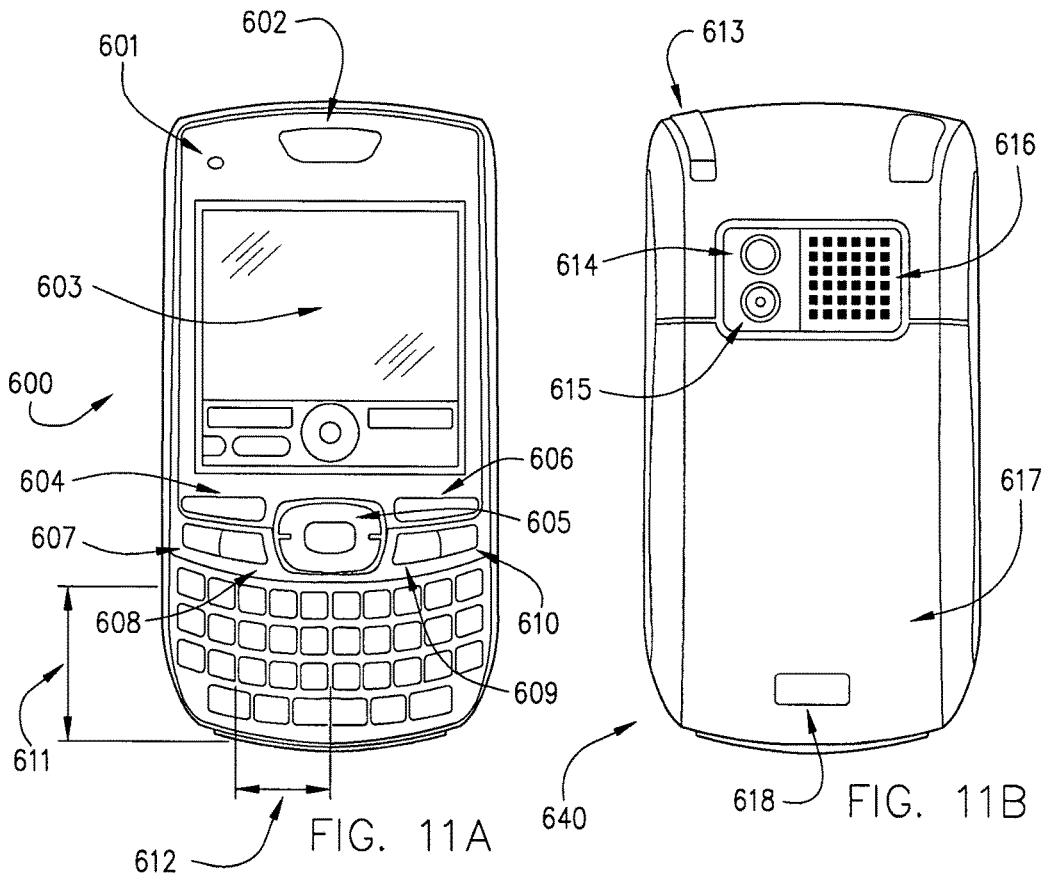
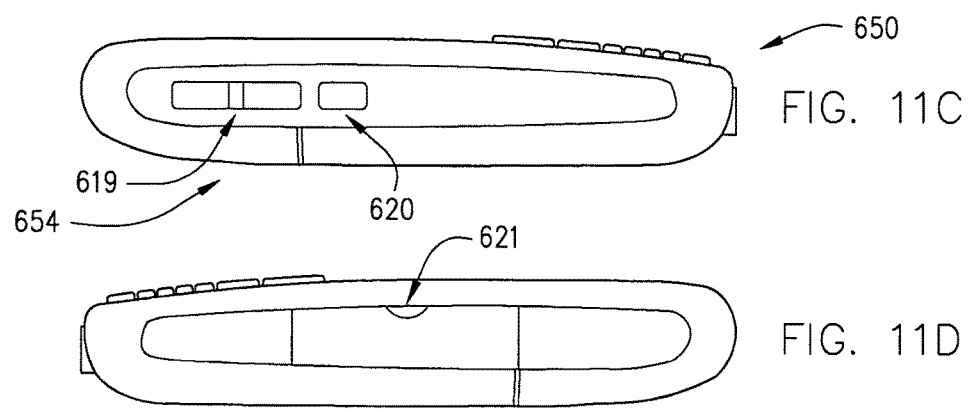
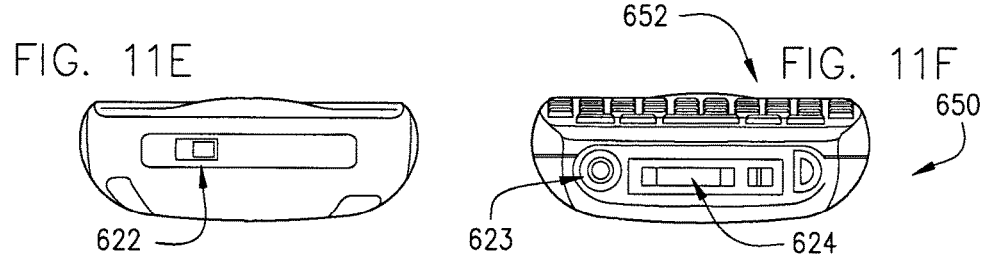

METHOD AND SYSTEM FOR PROCESSING IMAGES USING TIME AND LOCATION FILTERS

CROSS-REFERENCE TO RELATED APPLICATIONS

The present application claims priority to U.S. Provisional Pat. App. 60/873,066 filed Dec. 5, 2006 under 35 USC §119(e), the disclosure of which is hereby incorporated by reference in its entirety. The present application is related to U.S. patent application Ser. No. 11/726,712 filed on Mar. 22, 2007, titled "METHOD FOR PROCESSING IMAGE FILES USING NON-IMAGE APPLICATIONS," and is related to U.S. patent application Ser. No. 11/726,715 filed on Mar. 22, 2007 titled "AUTO-BLOG FROM A MOBILE DEVICE," both of which claim priority to U.S. Provisional Pat. App. 60/873,066. The disclosures of these two applications are hereby incorporated by reference in their entirety.

BACKGROUND

Users obtain digital pictures and movies from a variety of sources including digital cameras, digitization of photographs taken with film cameras, etc. These digital cameras may be stand-alone cameras or may be integrated into other devices such as cell phones (including Smartphones).

A user may capture hundreds or thousands (or more) pictures and movies over the course of time using these various devices. The task of organizing these pictures often falls to the user of the device. Some systems provide a user interface that allows a user to sort through pictures using a timeline. Other systems allow a user to manually label and organize pictures into virtual albums. The software that creates the album may include a drag and drop user interface or may include labeling pictures taken with a common album (folder) name. Some systems have allowed a user to search by location on a map if a user takes the time to label the location of each picture.

Many devices add various non-image data to an image file which can be viewed by subsequent devices. For example, many devices might include a time and date stamp, a make and model of the camera used to capture the image, shutter speed, an indication whether a flash was used, etc. One standard image file format used by digital cameras is the EXIF file format standard. The EXIF format includes defined fields for defined types of data and includes open fields which can be used to enter non-defined data.

BRIEF DESCRIPTION OF THE DRAWINGS

FIGS. 5-9 are screen shots of a filter and image display function according t one embodiment, which may be used with the system of FIG. 1;

FIGS. 11A-F are diagrams of a smartphone according to one exemplary embodiment of the device described in FIG. 1.

DETAILED DESCRIPTION OF EXEMPLARY EMBODIMENTS

Figure 1:
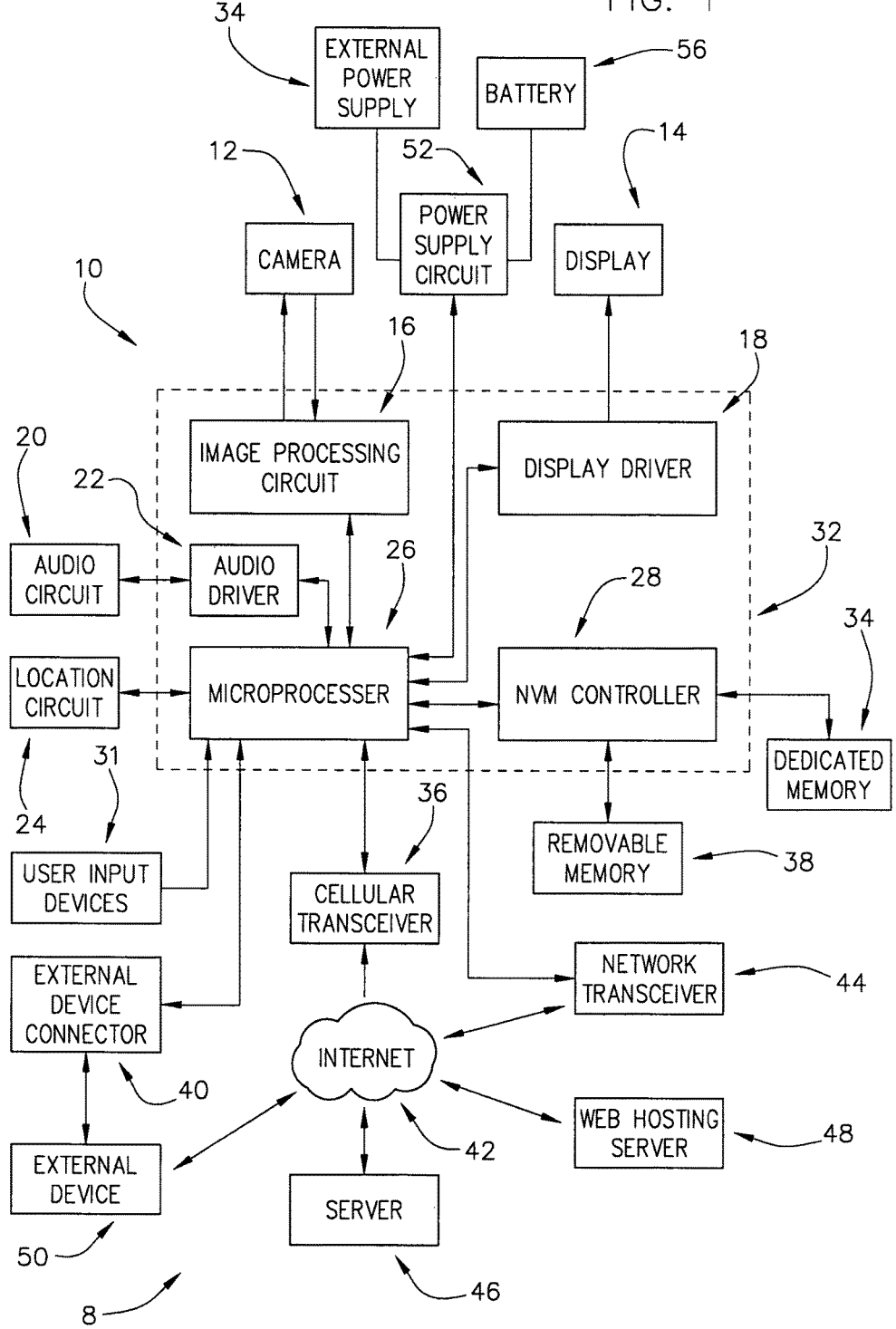
FIG. 1 is a block diagram of some portions of a system and apparatus according to one embodiment.
Figure 2:
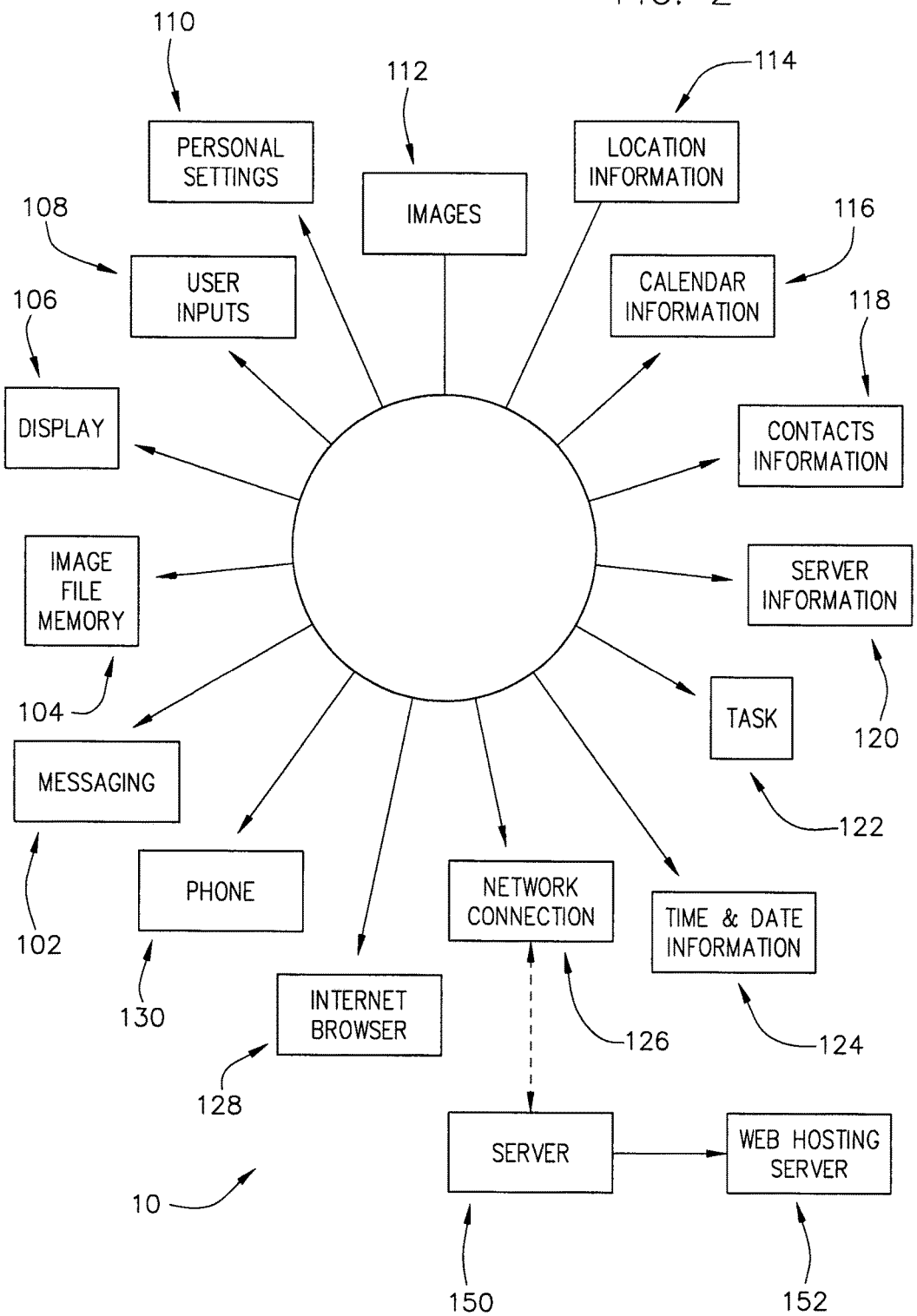
FIG. 2 is a functional diagram according to one embodiment, which may be used with the system of FIG. 1.

Referring to FIGS. 1 and 2, a system 8 includes a portable hand-held device 10. The portable handheld device 10 may be a cell phone (such as a Smartphone) that includes a cellular transceiver 36. Portable hand held device 10 may include a camera 12 to capture images. Camera 12 may be configurable to capture still images (pictures), moving images (movies), or both still and moving images. Device 10 may use display 14 as a digital viewfinder that allows a user to preview a shot before capturing an image and/or to view a movie as it is being captured.

Images captured by camera 12 may be processed by processing circuit 32 (e.g. microprocessor 26 and/or image processing hardware 16). Image files based on the captured images may be saved in memory 34,38, transmitted to other systems 46,48 (e.g. by transmitters 36,44 or data port 40), or otherwise processed by device 10.

Processing circuit 32 may be configured to run one or more applications. For instance, device 10 may be used to capture images from camera 12 using an image application 112 run by processing circuit 32. As explained below, images captured by camera 12 may be formed into image files containing various data relating to the captured image.

Image application 112 may be used to enhance an amount of information recorded in the image file relating to the image captured by camera 12. For example, image application 112 may use information from other applications run by device 10 to add data to the image files created by the image application 112. For example, an image application 112 may be configured to obtain information from a location application 114, a calendar application 116, and/or a contacts application 118 running on device 10 and, based on the information obtained, add data to an image file.

Additionally, image application 112 may be designed to enhance user functionality once images have been obtained. For example, image application 112 may also be configured to display images on display 14. Image application 112 may include various filters used to limit the number of images displayed. As discussed below, these filters may be user selectable, may use the data in the image file obtained from non-image applications including any of the non-image applications discussed below, may be configured based on data in the image files 104 stored on device 10, etc. As another example, similar filters may also be used to group images into folders (such as virtual albums, system file folders, etc.). As still another example, image application 112 may use data stored in the image files 104, contact information 118, calendar information 116, and/or upload information 260 (FIGS. 3 and 4) to increase the ease of sharing images.

The images operated on by image application 112 may include images captured by camera 12, and/or may include images obtained from sources other than camera 12. For example, images may be transferred to device 10 using one or more of data port 40, transceiver 36, transceiver 44, and memory 38. As another example, a number of images stored on a remote storage (e.g. on a server 46,48), a personal computer, or other remote device may be accessed by device 10.

Image application 112 may be limited to a particular type of image (e.g. still images (photographs), moving images (movies), etc.) or may be configured to handle multiple types of images. Image application 112 may be a stand-alone application, or may be integrated into other applications. Image application 112 may be formed by a combination of functions of separate, distinct programs of device 10.

Figure 3:
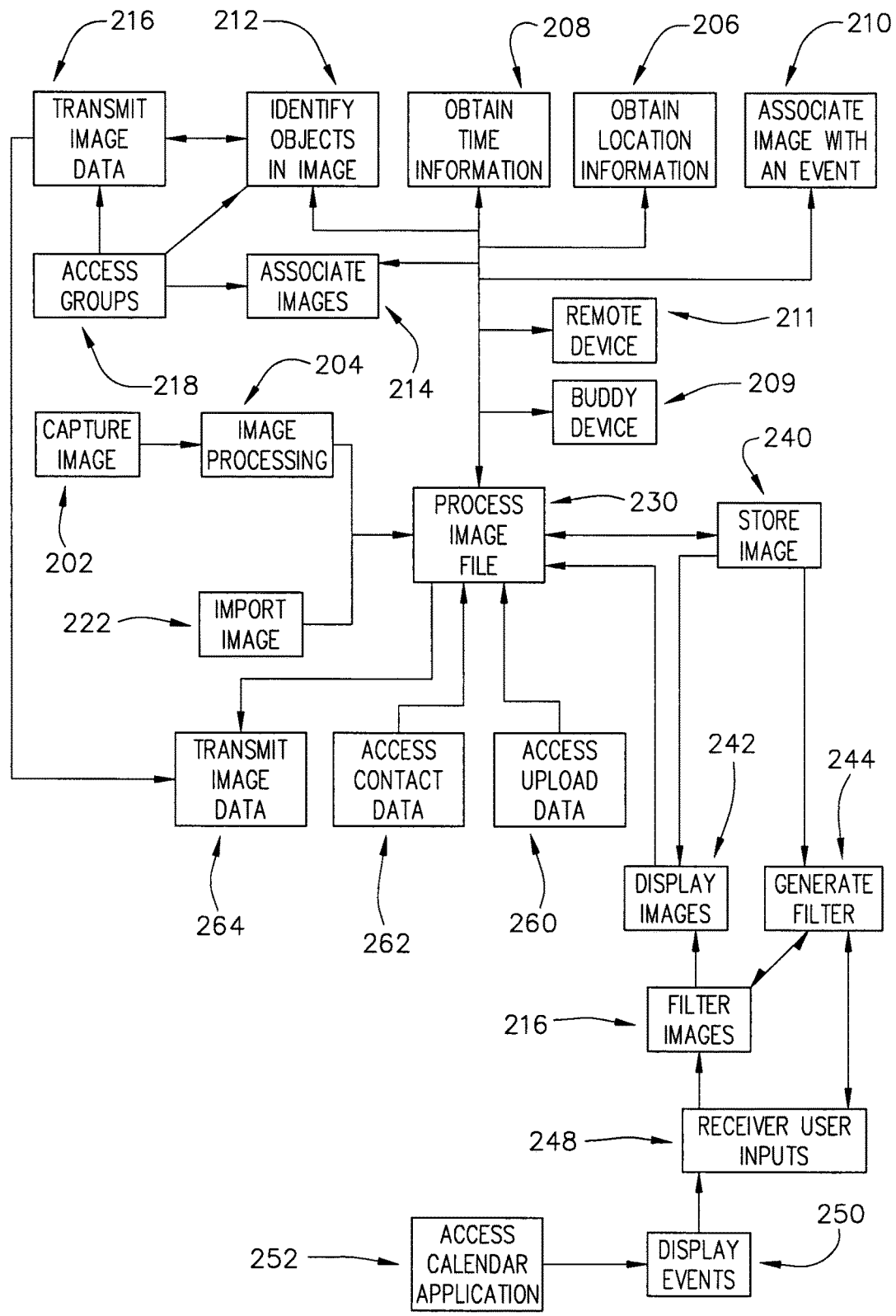
FIG. 3 is a diagram according to one embodiment, which may be used with the system of FIG. 1.

Referring to FIG. 3, an image application 112 may handle images obtained (captured) by camera 12 of device 10 at block 202 and/or images obtained (imported) from a source outside of device 10 at block 222.

At block 202, an image may be captured by device 10 such as by using camera 12 (or by some other device such as an external camera controlled by device 10 through data port 40). Capturing an image at block 202 may be performed under the control of processing circuit 32 and/or in response to a user input registered on a user input device 31. For example, processing circuit 32 may execute an image capturing application 112 (FIG. 2) which includes a command portion that allows users to input a command to capture an image using a button or touch screen input.

An image captured on camera 12 at block 202 can have any standard image processing performed on it at block 204 (e.g. format conversion, white balancing, tone correction, edge correction, red-eye reduction, compression, CFA interpolation, etc.) and remain essentially the same image This image processing at block 204 may be performed by a microprocessor 26 (FIG. 1) and/or by dedicated hardware such as an image processing circuit 16 (FIG. 1).

An image file may be formed at block 230 using the image data captured by the camera at block 202 and/or processed at block 204. The image file may use a standard image file format (e.g. EXIF, JFIF, GIF, PICT, MPEG, AVI, motion JPEG, etc.) or may use a non-standard format. The image data in the image file may be compressed at block 230 (such as by JPEG compression, MPEG compression, LZW compression, other DCT-based compression, etc.), including highly compressed with a lossy-type image compression, but still convey essentially the same image. Compression may be performed by a microprocessor 26, by an image processing circuit 16, or by some other processing circuitry of processing circuit 32.

The full size image in the image file may be an image having about the same resolution as camera 12. In some embodiments, the image in the image file may have a resolution smaller than resolution of the camera 12 (e.g. a full set of data is acquired from camera 12 and image processing circuit 16 reduces the resolution of the image data received from the camera to form the full size image in the file). In some embodiments, the user may be given an option to choose the resolution of the full size image.

A thumbnail version of the image (a reduced size version of the image, almost always smaller than the full size version) may also be added to the image file at block 230. Like the other processing on the image data, the thumbnail may be formed using microprocessor 26, image processing circuit 16, or some other processing circuitry of processing circuit 32. The thumbnail of the image generally conveys essentially the same image as the full size version of the image (even when they are image-processed—see block 204 of FIG. 3—separately).

Adding Information to Image Files

Once an image file is formed at block 230 (which may be before or after some or all of the image data has been added to the image file), additional data (e.g. non-image data) can be added to the image file corresponding to the image that was captured to enhance the amount of information stored about the image. Enhancing the amount of data stored about the image can increase the number of techniques (discussed below) able to be applied to the images in some embodiments. This additional information may be added to the file before or after the image data is added to the image file.

Information relating to the time at which the image was obtained (based on data retrieved at block 208) is typically added to the image file.

Also, location information can be obtained at block 206 (such as from a location application 114—FIG. 2—and/or location circuit 24—FIG. 1) and added to the image file at block 230. Location information can include coordinate information such as latitude and longitude coordinates; text information such as one or more of the name of the street, city, state, province, country and/or other location designation at which the image was obtained; information regarding the cell towers in the vicinity of device 10, etc. In many embodiments, the location information is retrieved automatically from a location determining circuit 24 (FIG. 1) or based on data from a location determining circuit 24 compared to a location name (e.g. map) database of a location application 114 (FIG. 2). Location information can also be obtained by comparing the network address (e.g. MAC addresses or other information) from a point used to access a network (e.g. a WiFi network) compared to a database (which may be on or remote from device 10) that identifies the location of the access point (identified based on the MAC address recorded when the image was captured).

Where location name information is to be added, device 10 may be configured to store the location name information (e.g. in memory 34,38, hard-coded, etc.) for a range of locations, including the location at which the image is captured. In some embodiments (particularly for a portable hand-held device such as a smartphone), device 10 may not store this information for every (or any) location, and may need to retrieve this location information. In embodiments where information needs to be retrieved, it can be retrieved from a remote database (e.g. a database on server 46) or some other source. Device 10 may obtain information from the remote database using a wireless transceiver 36,44 to access a WAN (e.g. the Internet) to which the remote database is connected. Device 10 could be configured to obtain this information only when (or additionally when) making a wired connection to a database (e.g. when syncing to a user's personal computer). In some embodiments, such as some of the embodiments requiring a wired connection, location name information may not be added to well after a picture is captured.

In some embodiments, device 10 may be configured to automatically update the location information it has stored. For example, device 10 may be configured to receive location coordinates based on data from location circuit 24, determine that it does not have location name information for the region where it is located, and obtain location name information for that region from the remote database (e.g. by sending its coordinates to the remote database). Device 10 may be continuously updating its stored location name information or may update this information in response to a user opening the image application (e.g. a picture or video capturing application).

In some embodiments, rather than (or in addition to) continuously updating location name information, device 10 may obtain location name information in response to an image being captured. For example, device 10 may be configured to capture an image, obtain coordinate information from a location circuit 24 in response to the image being captured, send the coordinate information (or other non-name location information) to a remote database, and receive location name information associated with the coordinate information from the remote database.

In some embodiments, a combination of the two previously discussed techniques may be used. For example, city, region, and country location name information may be obtained automatically in the background. However, street level location name information may not be downloaded until a picture is captured.

In some embodiments, the amount of data downloaded for an area may depend on how many pictures are being obtained in the area. For example, if a large number of pictures are being taken closely in time in a city, then more information might be downloaded and saved to device 10 (e.g. automatically). As another example, if pictures are being taken in a close time range in a tight geographical area then less information is downloaded, whereas if pictures are being taken in the same time frame in a larger geographic area, then more information is downloaded and saved (e.g. automatically).

In some embodiments, the detail of information downloaded might change (and might change automatically). For example, in a user's home area, more detailed information might be downloaded. As another example, in more densely populated area more detailed information might be downloaded. As still another example, the detail of information downloaded may be user selectable.

In addition (or as an alternative) to information from a location application 114, in some embodiments the location information may be information that is manually input by a user on a user input device 40. Further, in other embodiments location information is retrieved from another source with which the image file is associated (e.g. the location information stored for an event associated with the image—see discussion of block 210, below—may be used as the location information for the image).

In addition to adding location information at block 206, images may be associated at block 214 and this association may be used to add data to the image file. Files may be associated at block 214 by any number of means. As a first example of a means for associating images, processing circuit 32 may automatically associate images based on similar data (e.g. non-image data) within the image files. Common non-image data may include that the images of the image files were captured at a common location, were captured during the same time period (such as during an event listed in the calendar application, see block 210 below), that images are clustered together in time, and/or other data associated with the image (such as data in the image files that indicate that the image files include images of one or more people from an associated group of people). Multiple criteria may be used to associate images (e.g. images are required to have been taken at a common time and at a common location).

The criteria used to associate images at block 214 may vary based on the user's location. For example, in an area around a user's home town the images may be required to have a closer link than images acquired while a user was on vacation. This may be a closer link on one criteria or on a combination of criteria.

The criteria for association at block 214 may also vary based on the device from which an image was captured. For example, images captured on the hand-held device 10 may be freely associated based solely on a factor relating to a time at which the image was captured. However, device 10 may be configured to associate images not captured by device 10 based on a combination of time with another factor such as location, names of people associated with the image, etc.

Also, the criteria for association at block 214 may differ depending on the number of and which criteria of the pictures match. For example, a less strict time criteria may be used if the images were all taken at a similar location. As another example, a less strict location criteria might be used if the images largely included the same group of people in the images.

As a second example of a means for associating images, images may be associated at block 214 based on actions of a user (e.g. a user assigning the images to a common folder, a user selecting a number of images and choosing a command to associate the selected images, etc.).

Once images are associated at block 214, non-image data can be added to the image files at block 230 based on the association of images at block 214. As one example, the non-image data representing the fact that the images are associated could be added to the image file. As another example, non-image data from one image file may be added to another image file based on the association. For instance, event information associated with one image could be added to the image file of an associated image, names of people associated with one image could be added to the image file of an associated image, location information associated with one image could be added to the image file of an associated image, etc. If a common folder is used to associate images at block 214, a user may assign data to the folder to signify common properties of images in the folder, which data assigned to the folder will be added at block 230 to all image files in that folder.

Another source of non-image data to be added to an image file at block 230 is non-image data that is based on the image in the image file. An image may be subjected to an image recognition program at block 212 that recognizes objects (e.g. people) in an image. According to one embodiment, the image recognition program is used to identify people located in an image. The image recognition program may be pre-trained to identify certain individuals (such as individuals the user may photograph regularly) and then look for those people in the images of device 10.

Data based on the object recognition can be added to the image files. As one example, the names or other identifications of the people recognized in the image at block 212 may be added to the image file. As another example, a user may set one or more pre-defined groups of individuals in a configuration phase. These groups may be accessed at block 218. If a user identified in the image is associated with a group (e.g. family, school friends, co-workers, etc.) then a label corresponding to that group may be added to the image file data.

The image recognition application may be run by hand held device 10, or may be run on a device 46 (FIG. 1) that is remote from hand held device 10. If the recognition application is remote from device 10, then some or all of the image file may be transmitted to the remote device 46 at block 216. Remote device 46 may be configured to transmit the file back to hand held device 10 at block 216, and/or hand held device 10 may be configured to access remote device 46 and obtain the recognition data at block 216.

Another source of non-image data that can be added to the image file is event data. An image may be associated with an event at block 210. Hand-held device 10 may be configured to automatically associate an image with the event, or a user might manually associate an image with the event. Hand-held device 10 may automatically associate an image with an event by comparing non-image data of the image with one or more events in a calendar application 116 (FIG. 2). For example, an image may be associated with an event by comparing the time (e.g. date and time of day) at which the image was obtained to the time of the event. As another example, an image might be associated with an event based on the location of the event recorded in the calendar application compared to the location at which the image was captured.

If event data is automatically obtained and/or entered as non-image data in the image file, the image application 112 may be configured to access the calendar application 116 (FIG. 2) of device 10 and search the calendar application 116 for events that might be related.

Also, if event data is automatically obtained and/or entered as non-image data in the image file, a hierarchy may be used to determine which event corresponds to an image. As one example, an event that was scheduled to occur for a period of time that includes the time at which the image was captured might be given the highest priority, an event that is close in time to (but does not encompass) the time of the picture might be given a second priority. The calendar application may also have all day events scheduled, which have less specificity of time than the defined time events such as the first and second priority events. All day events scheduled the date the image was captured may be given a third priority.

For events that are close in time but not exact, the criteria used to judge closeness might be pre-set or might be variable. For example, the criteria might be more strict if the user has a lot of events scheduled in the calendar application (e.g. on a particular day), and less strict if there are fewer events. Other criteria may be used to generate a hierarchy as well, including a complicated hierarchy based on more than one factor (e.g. more than just time). Exemplary factors include time of the event versus time of the picture, location of the event versus location of the picture, people associated with the event versus people associated with the picture, association with pictures that have been associated with the event (e.g. clusters of photos), etc.

The location at which the picture was taken compared to the location of the event might be used to exclude association with an improper event.

If an image file is associated with an event at block 210, data entered for the event in the calendar application 116 may be added to the image file at block 230. This may include the name of the event, other attendees of the event, a classification of the event (business, personal, etc.), a location at which the event took place, a tag which associates the event with the image file, and/or other information entered for or related to the event.

An event stored on device 10 may be an event associated with a user of the device (e.g. a user's personal calendar) or could be an event associated with someone with whom the user is associated (e.g. a family member, a co-worker, etc.). One or more calendar applications 116 (FIG. 2) running on device 10 may be configured to store a user's event information along with event information from other people.

In addition to obtaining information relating to an event stored on device 10, calendar information may be obtained from sources remote from device 10. For example, a user may have a database set up for family member calendars which can be accessed from device 10 over a network, when a user synchronizes their device with a personal computer, etc. As another example, a "buddy" of the user of device 10 may have the user of device 10 listed as an attendee at an event on their calendar. Device 10 may be configured to access the buddy's event information (e.g. on a remote database, from a device within range of the user—e.g. within a Bluetooth connection range—etc.) and add event information based on the buddy's event that lists the user as an attendee. As another example, a system may be used to track movement of device 10 and other users (e.g. a central tracking system that uses GPS positions from devices carried by the users). If the user of device 10 is in proximity to another user during an event listed by the other user, the event information listed by the other user may be added to images captured by device 10.

In addition to private events, one or more databases may be scanned for a list of public events that were taking place at about the same time and about the same location at which the image was captured.

Thus, even if a user does not have an event listed, device 10 may be configured to access the remote database (e.g. the family member calendars, buddy list events, public events, etc.) and look for event information in the remote database.

Any of the differentiators listed above may be used to determine whether the image is associated with the event not listed in a calendar application 116 on device 10 and/or not directly associated with the user. For example, the location at which the image was taken, the time at which the image was taken, people identified in the images, the locations of other individuals, and other information may be examined to determine whether a user was really attending an event obtained from a non-user source (i.e. whether these other sources of information are consistent with information regarding the non-user obtained event).

As discussed above, images associated with an event at block 210 may then be associated with each other at block 214. Conversely, images associated with each other at block 214 (particularly where the images were captured at about the same time period—e.g. clustered together) may then be associated with the event at block 210 even though some of the associated pictures were not themselves captured during the time period listed for the event in the calendar application 116.

In addition to obtaining information from device 10, information may be obtained at block 211 from sources outside of device 10. Information may include event information, location information, and other information not contained on device 10. For example, the time and location at which an image was taken can be compared to times and locations of public events (e.g. from a database, from a search of the Internet, etc.). If an image appears to have been taken close in time and location to the time and location of the event, information may be added to the image file based on the event.

As another example, information relating to businesses located where the image was captured can be obtained from a remote database. This information may be associated with the image. This information can also be used to imply event information (e.g. an image captured at a restaurant around dinner time could be assumed to be from eating dinner at the restaurant, a picture obtained at a movie theater could be implied to be going to a movie, a picture obtained at a bowling alley could be assumed to be going bowling, etc.).

It may also be possible to automatically download a new contact record for the business concerned, particularly if it included auxiliary info like opening hours, reservation policy, web site, etc.

The database information may be associated with an image on device 10, or device 10 could be configured to transmit information about the image to a remote database, which database associates the image and transmits the associated information back to device 10 (e.g. as a packet of information, in a newly enhanced image file, etc.). Once information from a remote database is obtained, this information can be compared to other information associated with an image to determine whether the downloaded information is truly applicable to the image.

In addition to adding information as discussed above, information may be added based on a buddy device at block 209. Information that may be added from buddy devices includes event information, that a buddy is associated with an image, or any other information contained in the buddy device or related to the buddy device. For example, device 10 may be configured to detect the presence of a device associated with a second person (e.g. a user's "buddy"). This may be done, for example, by creating a wireless link such as a Bluetooth link between the two devices. As another example, device 10 and the device of the second user may both be tracked by a tracking service (e.g. using a location circuit such as a GPS circuit in each device). Device 10 may be configured to access the tracking service information to determine which people were in the user's vicinity around the time the image was captured.

Device 10 could be configured to identify people on its own. In another embodiment, a user may pre-configure device 10 to identify the presence of selected people who may be added to a user's "buddy" list. Device 10 may be designed such that it is configured to only identify or configured to primarily identify the presence of the selected people.

If an image is captured around a time during which a buddy is present, information relating to the presence of the buddy may be associated with the image (e.g. added to the image file of the image). This information may be used to share images with the second person (see discussion below), may be compared with event attendees listed in an event of a calendar application 116 (FIG. 2) or events remote from device 10 to help determine whether a user is present at the event (e.g. images captured in the presence of listed attendees of an event would suggest that the user is more likely at the event), may be used to increase the efficiency of a face recognition program (see block 212), or may be put to other uses.

Any of the information added to the image file discussed above may be obtained automatically when the image is captured, or may be obtained in response to a user input. Also, one or more of the above mentioned types of information might be obtained automatically, while other information might be obtained in response to a user input.

The data to be added may be based on information that is entered by the device (e.g. location information from a GPS circuit 24, location information from a location application 114, time information from a timing circuit, calendar information derived from a calendar application 116—including calendar information previously entered in a calendar application by a user for the purpose of creating an event in the calendar application, etc.) or may be data manually entered by a user (generally, data entered after an image has been obtained). In some embodiments, the image file may include both data that is entered by the device and data that is entered manually, including having both device entered and manually entered data relating to a common subject matter (e.g. location, associated people, etc.).

Any of the above mentioned data added to the image file may be hidden in the data file such that it is not normally displayed to a user. Alternatively (or additionally), the above mentioned data may be added as text fields viewable by a user. For instance, the data may show up in the title associated with the picture, such as using the data to the name the image. As an example, the image may be given a name based on an event with which it is associated, a person or people recognizable in the image, the location at which the image was obtained, a time at which the image was obtained, some other non-image data, or a combination of two or more of these types of non-image data. In some embodiments, the data may include the data in a first form that is hidden from a user and data in a second form that is viewable to a user. The specificity of the data viewable to the user may vary (e.g. data acquired close to a user's home area might be labeled more specifically than an area away from a user's home area).

Any of the above data may be added to the image file at the time the image file is obtained (e.g. created). Alternatively, one or more of the data discussed above could be added to an image file that has been saved in memory 34,38 at block 240.

Non-image data may be associated with an image file by storing the non-image data in the image file, may be associated by storing the non-image data in a separate file that identifies the data as associated with the image file, or may be associated in some other manner that is accessible by an electronic device.

When adding data to images not captured using camera 12, device 10 may examine the non-image data in the image file received from the other device. Device 10 may be configured to add more or less data to that image file based on the non-image data already in the image file. For example, a user may configure device 10 by inputting other digital camera makes and models owned by the user (or user's family). This input may be a manual input, or could be automated (e.g. a user might indicate that an image was captured using another camera owned by the user and device 10 could search the image file of the image for make and model tags which can then be used by device 10 to perform the configuration. In operation, device 10 may search for non-image data tags in an image file indicating the make and model of camera used to capture the image. If the make and model of the camera matches a make and model input by the user, then device 10 may assume that the image was more likely to have been taken by the user. Based on this determination, device 10 may more freely add non-image data (such as event data) to an image file.

Organizing Images

Still referring to FIG. 3, images from image files that have been obtained 202,222, processed 230, and/or stored 240 can be displayed 242 on display 14 (FIG. 14). Device 10 may be configured to display the original image, a processed (e.g. uncompressed, resized, etc.) version of the image, a thumbnail of the image, or some other similar image that is essentially the same image as the primary image stored in the image file. Device 10 could also display 242 an altered version of the image that does not convey essentially the same image as the primary image of the image file.

Device 10 may also be configured to share images 264 to which device 10 has access. Device 10 may be configured to share pictures in a message (e.g. e-mail, SMS, MMS, etc.) or may be configured to transmit the images over a network (e.g. to a weblog or other file sharing service).

If large numbers of image files exist, device 10 may include ways to reduce the number of files through which a user needs to sort to select an image for sharing, viewing, or taking other actions. This may include filtering images 246 using generated filters 244, pre-configured filters, user entered filters, or some other type of filter. The filters may relate to any information such as any one or combination of the non-image data discussed above which may be associated with an image file. As shown in FIGS. 5-9, a pair of filters may include a location filter and a time filter.

For a system that uses filters by subject matter, there may be more than one filter menu 402,418 that relates to that subject matter. For example, there may be one filter menu 402 that relates to broad categories and a second filter menu 418 that relates to narrower categories within the broad categories (e.g. one relates to a state/province location and another relates to a city location within the selected state/province). As another example one filter menu may relate to time information such as date range whereas another filter menu might relate to time information such as time of day information.

Filters selectable by a user may include filter options 414,416 of varying degrees of specificity. As a first example, referring to FIG. 9, a first filter menu 402 may cover a broad range (e.g. month in which photo was taken, state where photo was taken, groups that have been set 218 by a user, etc.). A second filter menu 418 may be responsive to the selection 410 on the first filter menu 402 to display filter options that are narrower and related to the broad filter option 410 selected in the first filter menu 402.

Figure 6:
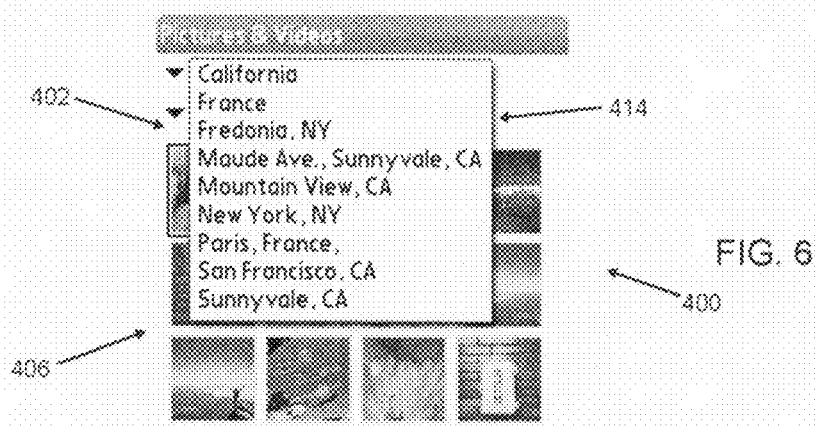
Figure 7:
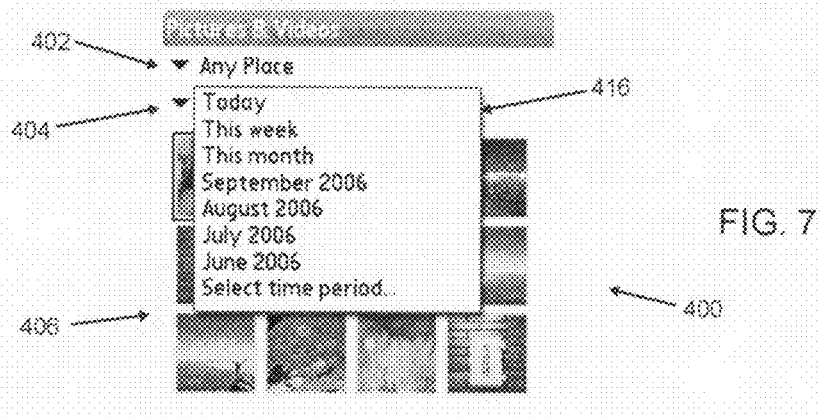

As a second example, referring to FIG. 6, a first filter menu 402 can include multiple filter options 414 of varying specificity within the same menu 402. A single filter menu can include a first filter option directed to a broad category (e.g. the state of California) and a second filter option directed to categories that are within and narrower than the first filter option (e.g. cities within California). The filter menu 402 may include a third filter option that is narrower than and/or within the second filter option (e.g. areas, streets, etc. within a city).

If filters are generated at block 244 (FIG. 3), the filters may be generated by the device 10 based on various factors. In many of these embodiments, factors such as the information provided by the non-image data in the image files may determine which filters are generated. For example, where filters are directed to a type of non-image data, image application 112 (FIG. 2) may identify the scope of the entries of data in the image files, and to generate filters corresponding to the scope of the entries.

As a more concrete example, referring to FIG. 6, device 10 (FIG. 1) may identify that pictures 406 were taken in particular locations (e.g. various cities in California, New York, France, etc.) and, in response, generate filter options 414 corresponding to those locations (and not generating filter options for locations not represented in the non-image data of the image files). Device 10 may be configured to generate varying levels and/or specificity of filter options based on data stored by device 10 and/or associated with the images. As an example of basing the filters on data stored in device 10, if pictures 406 were taken in the vicinity of a user's home area (e.g. Sunnyvale, Calif.), device 10 may provide filter options 414 with more specificity for images taken in that area (e.g. also providing Mountain View, San Francisco, Maude Ave, etc.). As an example of basing the filters generated on data associated with an image, if a large number of pictures were taken in close proximity to each other, filter options 414 with more specificity may be generated (e.g. Fredonia, N.Y.). However, where fewer pictures were taken in any particular location within a region, then only broader filter options 414 (e.g. France) may be generated which cover the region.

Referring to FIG. 8 as another example of basing the filters generated on data associated with an image, device 10 may be configured to generate filters based on clusters of images. If images are clustered in time (e.g. time of day, date, etc.) filter options may be generated which encompass the time periods of the clusters.

As another example of generating the filters 244 based on data associated with an image, filter options 416 may be generated based on event information associated with one or with multiple images. This filter option 416 may be based on event information stored in the image files. Alternatively (or in conjunction with event information in the image files), filter options may be based on time information in the image files and event information in a calendar application 116 (FIG. 2). The filter option generated 244 may be an option to select an event, may be a time-related option 416 that provides a date (or range of dates) associated with the event, etc.

Event-related filters may be based on a specific event or may be based on a recurring event. For example, a filter may be based on a user's birthday (or scheduled birthday party) which will reoccur annually. As another example, a filter may be based on a holiday such as independence day, labor day, or a religious holiday, which holiday may occur on the same or different day each year. Using these filters a user may be able to find images from multiple years that each relate to a common theme. As another example, a user might have a generic event "vacation" scheduled in their calendar application 116 each time they go on vacation. A filter may be able to sort for all vacation pictures. A user may use a time filter to sort between the various pictures which each meet the recurring event filter.

The event data may include personal event data (such as a user's schedule) or may include public event data (such as holidays, local events that correspond to the location and time at which the picture was taken, etc.).

One embodiment of using event filters is to access images 252 from a calendar application 116 (FIG. 2) based on association with an event in the calendar application 116. In this embodiment, a user may open a calendar application 116 at block 252. The events listed for the calendar application may be displayed at 250 in a day view, a list view, in an agenda view, or in some other view. A user may input a command 248 in the calendar application 116 to display all images associated with one or more of the listed events. Device 10 would then generate one or more filter sets 244 that identify images associated with the event, and filter the images 246 to which it has access using the generated filter set(s). The resulting images are displayed 242 to the user, such as on display 14.

Figure 10:
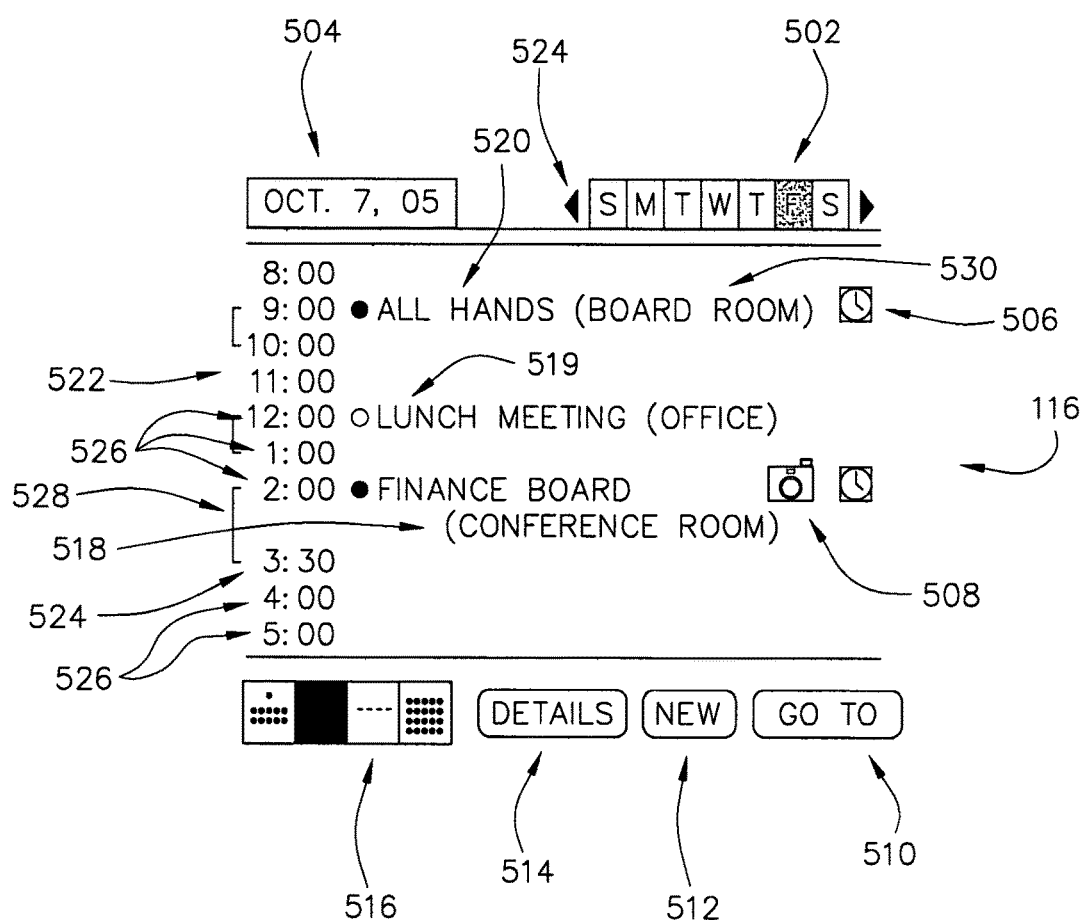
FIG. 10 is a screen shot of a calendar application which may be used to access and/or organize images according to one embodiment, which may be used with the system of FIG. 1.

Referring to FIGS. 3 and 10, a calendar application 116 may display information (block 250) relating to events 518-520 stored by the application 116. The events 518-520 may be organized in a day view (as shown), could be arranged in a list of events, could be arranged by month, or could be arranged in some other way. Events 518,520 with alarms may include an icon 506 representing that an alarm has been set. Events 518 with associated photographs may include (although need not include) an icon 508 indicating that there are associated photographs.

The photographs may be filtered (block 246) and displayed (block 242) from the calendar application 116. Receiving a user input (block 248) to filter and display the event related photographs may be accomplished in any number of ways. In some embodiments, a user may need to view the details 514 of the event 518, and then choose an option after the event is opened to view the photographs. In some embodiments, a user can select a menu option (not shown) which would allow the user to find all related photographs. In some embodiments, a user may click on the photo icon 508 (which serves as a control option) to input a command to find photographs related to the event 518.

Various filters may be used to identify photographs related to the event 518. For example, device 10 may look for image files having data associated with the image file that explicitly indicates that the image file is associated with the event (e.g. non-image data in the image file naming the event). Device 10 could look for image files that were acquired at a time that was proximate to the event. Device 10 could look for image or non-image data associated with the image file indicating that the image includes a picture of a listed attendee of the event 518 (e.g. combined with a less strict time filter such as "taken on the same day as the event"). Device 10 could look for images taken at a location proximate to that listed in the location field of the event. The criteria for determining whether a file is associated with an event could also include any of the criteria discussed above relating to block 210.

The image files to be filtered (block 246) and displayed (block 242) could include image files created on device 10 and image files not acquired by device 10. The criteria for images not taken on the device 10 may be different (e.g. more stringent) than the criteria used for images taken by camera 12.

The results of one or more filters (or sets of filters) may be combined and displayed to identify more images as associated with the event. Alternatively, a single filter set might be used to identify all images related to the event 518.

Referring to FIG. 2, in addition to selecting images from a calendar application 116, images may also be selected from a location application 114. For example, a location application may be configured to display a map. A user may select a geographic region of the map and then all images may be filtered by location such that all images associated with that geographic region may be displayed. A user may be allowed to navigate through different degrees of specificity of the map data (e.g. world, country, region, city, street, etc.) such that filters having different degrees of specificity may be displayed to a user. Filter options may be provided to the user in the form of icons on the map that indicate where images were obtained. A user may select a filter by selecting an icon.

In addition to selecting an image using a calendar application 116 or a location application 114, images may be selected using a contact information application 118. For example, if non-image data in the image files on device 10 indicate that a contact has been identified in or is associated with (e.g. is in the picture, was at an event at which the picture was captured, etc.) one or more images, an image icon similar to icon 508 (FIG. 10) may be associated with that contact's record. Selecting the icon may cause device 10 to filter and display images based on the contact's information. The images associated with a contact may be shared with the contact. For example, a user may be presented with a control option that allows the user to send a contact all images associated with the contact (and/or associated with contact and meeting some other filter).

Images can be organized and/or filtered by any number of additional applications as well, such as any shown in FIG. 2 and/or discussed below.

Referring to FIGS. 1 and 3, generating filters (244) can be done based on data associated with images stored by device 10 (e.g. stored in memory 34, removable memory 38, a volatile memory, etc.), with images stored on device 10 (e.g. stored in memory 34, a volatile memory, etc.), with images displayed 242 on device 10, with images stored remotely 48 from device 10, and/or stored or processed in some other manner.

Referring to FIGS. 3 and 5-9, any of the possible filter options 414,416 generated (244) may need to meet certain criteria before being presented to a user. For example, a certain minimum number or percentage of images 406 might need to correspond to the filter option 414,416 before being generated (244) and presented to a user for filtering images (246). As another example, an event 518 (FIG. 10) used to generate a filter option 416 may need to have a minimum duration before being used as a filter option 416.

If a minimum criteria is used, the criteria may be variable. For example, the criteria might change based on other filter options 410,412,420 that are in effect, the number of images displayable, etc.

Filter options 414,416 generated (244) based on data within an image file may be generated based on (at least or only on) images organized together (e.g. within a common folder, stored on a common memory, etc) or may be based on (e.g. at least on or only on) all or substantially all of the images accessed and/or accessible by device 10.

The filter options 414 presented (248) to a user may change based on the selection of other filter options 416. For example, referring to FIG. 9, in a system that uses both time 404 and location 402 filters, if a user chooses a particular location 410,418 (e.g. Salamanca, N.Y.), then the filter options 416 (FIG. 8) corresponding to time information may be limited to the times during which images were taken in that location. Further, if this time period is more limited, more specific time filters may be presented to a user.

In addition to filters automatically generated (244) by device 10, a user may be able to manually provide (248) a filter. For example, a user might enter (248) a manual filter option for "picadilly circus." The manually entered (248) filter may be full words or may only need be word segments in some embodiments. For example, a user might enter (248) the manual filter "rom jun." Any image file that has associated data which includes that combination of segments (e.g. pictures of Rome taken in June, pictures related to the Cajun romance festival, etc.) would be displayed (242) based on the filter. Any other number of rules might be applied to using word segments (e.g. the two segments might need to be in the same class—location, time, etc., the data associated with an image file need only be associated with one of the words or word segments, etc.). Also, manually entered (248) word (including word segment, full word, etc.) filters can be limited to a particular field or class of data (e.g. location, time, text, etc.) associated with the image files. In one embodiment, the manual text search will only search for data in a single field per input. In another embodiment, the manual text search will only search for data in the time and/or location fields.

A user may be able to save a manually entered filter so that it can be used again. The saved filter may show up as a filter option 414,416 in the filter menus 402,404. The filter menu 402,404 could be configured to only display a limited number of previously manually entered filters (e.g. only the past five manually entered filters relating to the subject matter of the filter menu 402,404 may be shown).

A user may be given an option to change the label assigned to a filter. For example, a user could label a location filter option at a given address as "home" or "bob's house." As another example, a user could label a date filter option from a specific day as "daughter's birthday party." This may be done for both automatically generated filters and for user-generated filters. Also, these labels may be automatically changed based on information from other sources, such as a user's calendar. For example, a date filter for a period during which a user's calendar indicates that the user was on vacation in Italy in 2006 may be automatically labeled "Italy vacation 2006." This same label could, alternatively, be used to label a combined location and date filter.

Filters can also be generated (244) based on image data.

In addition to displaying (242) images based on filters, the filters could be used for other applications. For example, filters could be used to arrange images into folders (e.g. virtual albums, system files, etc.) based on associations of images, could be used to send image data to others (e.g. contacts from a contacts application 118, a web server, etc.) to share images, etc. These actions may be taken automatically by device 10, or may be done in response to a user input.

Where folders are created, the image is moved to the folder (e.g. the image file corresponding to the image may be moved to the folder, a link might be created from the folder to the organizational location of the image file, etc.). A folder may be created which allows device 10 to automatically send (associate) all new images meeting the filter criteria for the folder to the folder. Creating a folder with filters may also allow the folder to find all previous images obtained which can be organized in the folder. In most embodiments where a folder is created based on filters, a user may still manually add or remove images from the folder.

One exemplary filter that may be used to organize images (e.g. place into folders—arrange into virtual picture albums—associate with a common link, etc.) is to group the images based on an association with an event. Association with an event can be based on event data associated the image file or may be determined as discussed above (e.g. regarding block 210 of FIG. 3, regarding FIG. 10, etc.). All the other types of filters discussed above could also be used to organize images as well.

Organization may be done automatically by the system (e.g. without any user intervention or in response to a user input to organize the images) for subsequent images that are obtained.

In one embodiment, a messaging (e.g. e-mail, SMS, etc.) application 102 (FIG. 2) has the ability to automatically attach multiple images to a message in response to a user input. The user input could include a filter option that filters images to be attached based on common non-image data (e.g. data indicating that the picture is of a member of a group, data indicating that a picture is associated with an event, data indicating that pictures were taken within a common time and location, etc.). As one example, a messaging application 102 may be configured to automatically construct an e-mail message to all attendees of an event 518 (FIG. 10) that contains all images associated with the event 518. The messaging application 102 may be configured to construct the message based on an input from the calendar application 116 (FIG. 2), and may access a contact application 118 (FIG. 2) to obtain the contact information for the attendees of the event 518.

As another example, a messaging application 102 might generate a message to everyone in a group (218) when data indicates that one or more than one members of the group (or a selected individual or individuals) are in the image. For example, a user may open or select an image. The user may then be presented with an option to send the image to a group using the messaging application 102.

The group options presented to the user may be based on the individuals who are in the image. For instance, if non-image data in the image file indicates that the image includes the user's children, an option may be presented to send the picture to everyone in a "family" group.

A user may set up the imaging application 112 and the messaging application 102 to automatically send messages containing images when certain criteria are met. For example, device 10 may be configured to automatically send all images taken during an event to all attendees of the event. As another example, device 10 may be configured to automatically send an image in which three or more members of a group were identified to all members of the group.

As other uses, contact information from a contact application may be used to construct a message created based on any other filters as well.

As another use, if a user attaches one image file to a message to be sent to a group, a user may be given an option to attach other images associated with the attached image. The association may be a common event, that the images were taken at a common time, etc.

Uploading Images

Referring to FIG. 3, any image stored on and/or captured by system 8 may be uploaded 264 to a server (e.g. weblog) from device 10. System 8 may be configured to access upload data 260, format the image file 230 based on the upload data, and then transmit 264 the formatted image file.

Upload data may include various types of information including public upload information and private upload information. Public upload information is information generally applicable to uploading an image file such as image file formats, tags for non-image data to be read by the recipient system, special arrangement of data within a file, the web address (URI, IP address, etc.) for uploading data to a recipient, passwords to access the server, a list of personal upload data needed from a user, etc. Personal upload information may include a user's account information (e.g. personal passwords for uploading data, web address of a user's page, account number, etc.), personal preferences for uploading data (e.g. size of an image, non-image data to be included in the file, etc.), and other information that is more unique to a particular user.

The public upload data may be different for uploading information to different entities (websites, servers, service providers, etc.). In this case, system 8 may include multiple different upload data sets (one or more pieces of information necessary to upload the data) for uploading images to various different entities, particularly for different entities that display the uploaded images on the Internet.

In some embodiments, the image file to be uploaded includes one or more of the pieces of non-image data added as discussed above. For example, the image file data to be uploaded may include location information 206 (e.g. from a GPS circuit) that was automatically added to an image file at about the time the image file was created. As another example, the image file data to be uploaded may include event information associated 210 with the image file.

Figure 4:
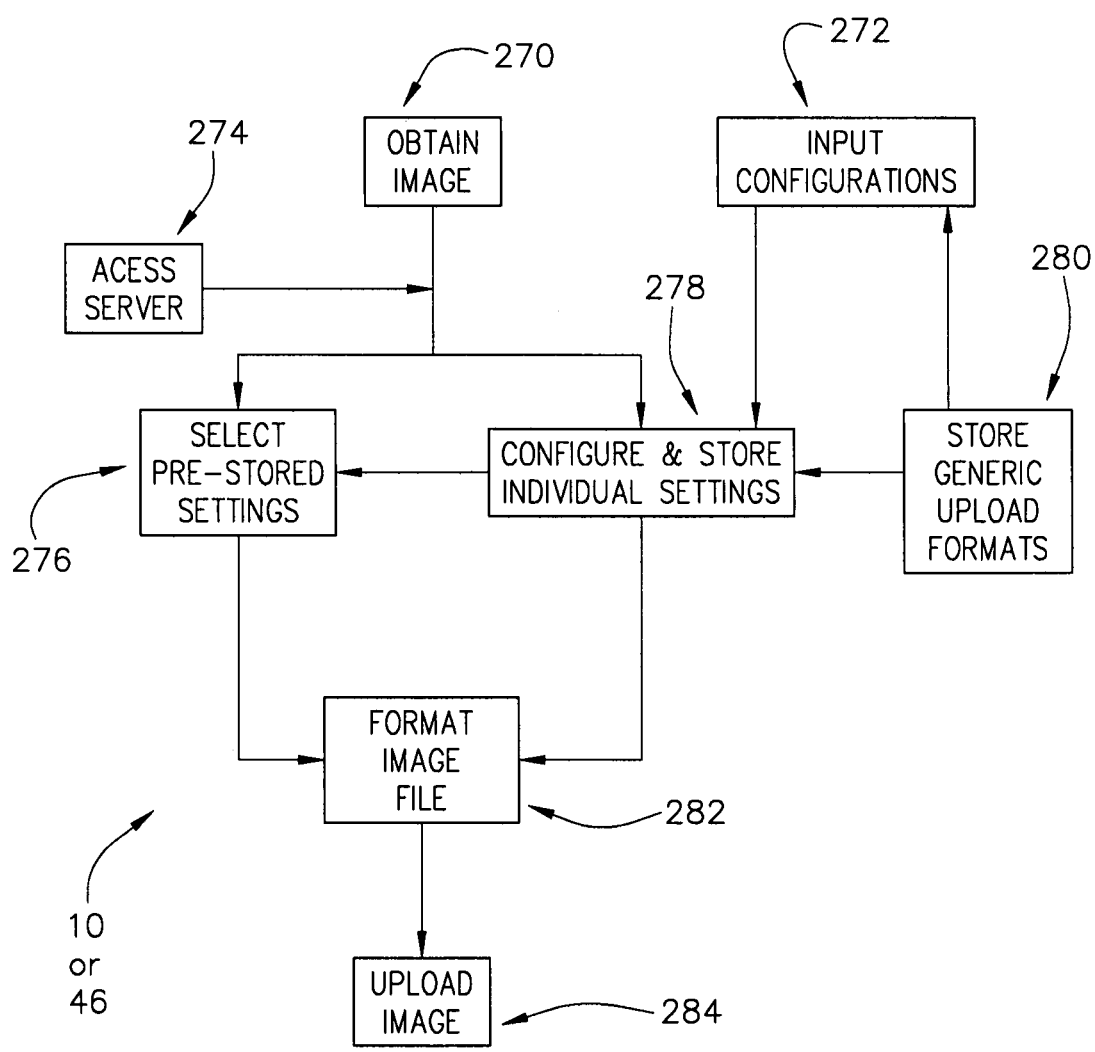
FIG. 4 is a diagram according to one embodiment, which may be used with the system of FIG. 1.
Figure 5:
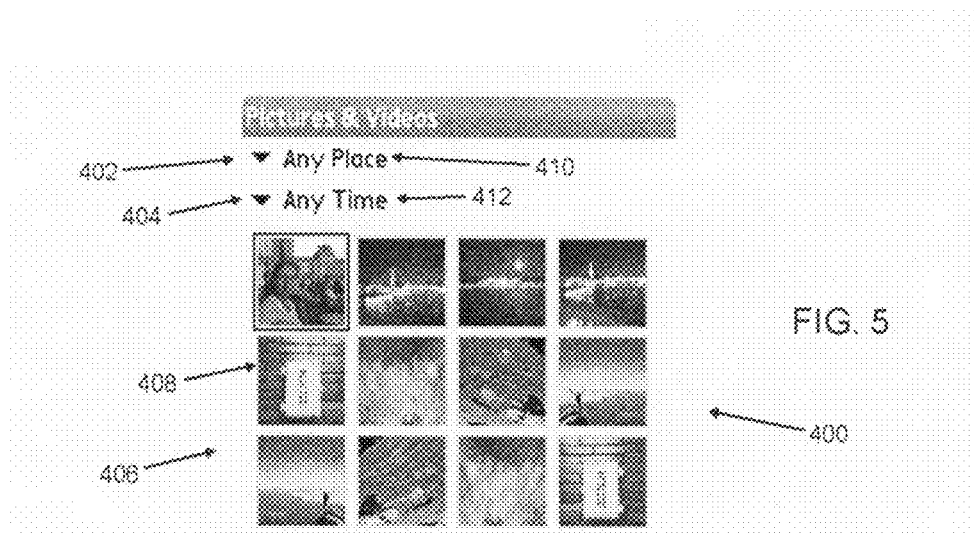

Referring to FIG. 4, a flow chart showing an image uploading application includes obtaining an image 270. The image may be obtained in any of the manners discussed above with respect to FIG. 3. If this is the first time an image is to be uploaded to a particular remote entity, system 8 may prompt a user to input 272 various configuration information such as an identification of the entity to which the data should be uploaded, personal upload information, etc. The information requested by device at block 272 may be based on public upload data 280. Based on the personal upload data from block 272 and the public upload data from block 280, system 8 may configure and/or store 278 upload settings for uploading images from device 10 (e.g. images captured by device 10) to the remote entity 48. Based on the upload settings from block 278, system 8 can be configured to properly format an image file 282 and upload the image file 284 to the remote entity 48.

On subsequent requests to upload information by a user, system 8 may allow a user to select pre-stored settings 276 and format the image file 282 based on the pre-stored settings selected at block 276. Instead of a user selecting settings at block 276, system 8 may be configured to make the selection. For example, if system 8 only stores a single user configured setting (e.g. only one set has been configured or activated by a user, or system 8 can only store one set, etc.), then system 8 may make the selection at block 276 rather than the user.

Referring to FIGS. 3 and 4, in one embodiment device 10 is configured to obtain image data 202, 222 (see block 270), access the upload data 260 (see, e.g. blocks 272, 278, and 280), format an image file 230 (see block 282), and upload the image file 264 (see block 284) to remote entity 48.

Referring to FIGS. 1, 2, and 4, in another embodiment, an entity 46 remote from device 10 (see block 150) is configured to access the upload data 272,278,280, format an image file 282, and upload the image file 284 to the remote entity 48. In this instance, the server 46 could be accessed 274 after the image has been obtained. For example, device 10 may access a server 46 remote from device 10 using one of the transmitters 36,44 of device 10 (e.g. by way of the Internet 42). Server 46 may run a program 150 configured to format the image file based on public and/or private upload data stored by server 46. Program 150 may be configured to format the image file 282 (FIG. 4) and upload the image file 284 to a second remote entity such as a web hosting server 48 configured to run a web hosting program 152 designed to share images from the image file.

In addition to performing the illustrated steps on either of server 46 or device 10, any combination of the steps may be performed on a combination of device 10 and server 46. For example, device 10 may input 272 and store 278 personal configuration information while server 46 stores generic upload information 280. Server 46 may be configured to receive data representing the personal configuration information from device 10, configure the settings 278 based on the personal configuration information received from device 10 and the generic configuration information stored by server 46, and format the image file 282 based on the configured settings.

Also, device 10 and server 46 may both be configured to perform the steps of FIG. 4. For instance, device 10 may be configured to store public upload data for a set of remote entities 48. However, for those entities 48 whose public upload data is not saved on device 10, device 10 may access server 46 which stores public upload data for those remote entities 48.

Web hosting program 152 may be configured to provide any number of functions, some of which may make use of non-image data obtained (and possibly formatted) by device 10. For example, if an image file is associated with location information, web hosting program 152 may create a mash-up which combines a map with the image (or an icon representing the image) by placing the image (or icon) at the location where the image was captured (or with which the image is associated based on the location information).

The mash-up may label a group of associated images taken at the same (or a series of) location(s) with the name of an event with which the images are each associated (e.g. the icon's label is the event name). The event information may be derived from the image file.

As another example, web hosting program 152 may be configured to notify others of the fact that information has been posted to the website. The notification may be an e-mail, and one or more of the e-mail addresses to be contacted may be derived from contact information (e.g. contact information obtained from contacts application 118) included in the image file. Device 10 could perform a similar notification once device 10 has uploaded images.

Any of the other information added to an image file discussed above may be formatted and/or transmitted for use by the remote entity in organizing and/or displaying the images.

EXAMPLES

The following exemplary systems may use any number of the options discussed above. These exemplary systems provide examples of various implementations of the invention but are not intended to limit the invention as claimed in the claims.

Example 1

A user may attend an event on their calendar named "Bocce Ball." The user may use the camera of their portable device to capture pictures during the event. The portable device will create an image file for the image including a regular size image and a thumbnail image. The portable device will perform processing on the image including compressing the regular size image.

When pictures are captured, the portable device will first look to add event information based on shorter duration events taking place when the picture was captured. The portable device will then look to longer duration (e.g. all day) events taking place when the picture was captured.

The portable device will automatically label the pictures taken during the event with the term "Bocce Ball" as well as saving this event information in non-displayed non-image data in an image file (in a comment field of the image file).

The portable device will also add a coordinate location and city name of the location at which the picture was taken, and the time of day and date at which the picture was taken. City information will also be added to the title field of the picture when the event is an all-day event.

The portable device will compare the time and date stamp of pictures taken with the portable device at times around the time of the "Bocce Ball" event to pictures taken during the "Bocce Ball" event. If the pictures around the time of the event are clustered with the pictures taken during the event, the portable device will add the event info to a non-displayed portion of the image files of the images captured around the time of the event.

The user may later receive other pictures that coworkers took with their cameras. The portable device will review the time and date stamp for each of those images to determine whether they took place during the event (or are clustered with the event) and will add the event data to a non-displayed portion of the image file if they were taken during that time.

In a review mode, the portable device will organize the images into a virtual album created automatically based on the "Bocce Ball" event data in the image files. A user can manually add or remove an image from the virtual album. If a user removes a picture received from an outside source (e.g. another event participant) or one of the pictures obtained close to but not during the event from the album, the portable device removes the non-displayed event data from the image file.

A user may share the images in the virtual album with the attendees of the event. A user is given a control option to send the images to all event participants. In response to receiving this input, the portable device constructs an e-mail message containing copies of the images in the virtual album. The portable device consults the event information to determine who was invited to and/or attended the event. The portable device inserts the e-mail addresses for each of the attendees of the event (based on the contact information in a contact application) on the e-mail message. The user may add or remove e-mail addresses to the e-mail message.

Example 2

A portable device operates as in Example 1, except that images are uploaded to a server to be displayed. The server organizes the images into virtual albums and shares the images, as discussed above for example 1, using the information in the images files and contact and event information stored by the server.

Example 3

A portable device acquires images as discussed above in Example 1. The portable device gives a user a control option to post the image to a website (such as to a weblog). The user selects a website for which they have previously entered account information. The portable device uses the pre-entered account information provided by the user in combination with pre-stored format information for the website to format the image file so that location information stored in the image file can be read by the weblog. The portable device then sends the specially formatted image file to the website to be posted.

The website receives the formatted image and reads the location and time at which the image was taken. The website allows viewers to pick images by the location by allowing users to select an icon on a map. Images taken at a common location are represented by a common icon on the map. Images which may be represented by a common icon on a lower specificity map can be represented by separate icons on a higher specificity map. The website viewer can use time filters to look for images taken during a particular time period.

Example 4

A portable device acquires images as discussed above in Example 1. A user can open a calendar application and view events that have occurred or are occurring. Events with which images have been associated include an icon that indicates that there are associated images. A user can view the associated images by clicking on the icon.

Example 5

A portable device operates as discussed in Example 1 except that the e-mail message is automatically sent without giving the user an opportunity to add or remove contacts from the e-mail message in response to the command from the user to send the message to all attendees.

Example 6

A portable device operates as discussed in Example 1. When the picture is acquired by the portable device, the picture is sent to a server over the Internet. The server executes a photo-recognition program to identify people in the picture and accumulates a list of people in the picture. The server then sends the list of people associated with the image back to the portable device which adds the names from this list to the non-image data of the image file associated with the image.

When the portable device assembles the e-mail message, the portable device also adds the e-mail addresses (from the contact application of the portable device) for people identified in the images attached to the message in addition to the event attendees.

Example 7

A portable device operates as discussed above in Example 6. The user is given a control option to send the pictures to the people identified in the pictures. In response to this control option, the portable device assembles a first e-mail message that includes all the pictures in which a first person was identified which is addressed to the e-mail address of the first person, a second e-mail message that includes all the pictures in which a second person was identified which is addressed to the e-mail address of the second person, etc. These messages are sent automatically by the portable device.

Example 8

A portable device operates as discussed above in Example 7. The user is given a control option to send the pictures to a group associated with the people identified in the pictures. In response to this control option, the portable device assembles an e-mail message that includes all the pictures in which a person was identified which is addressed to the e-mail address of the group associated with the person identified in the picture.

This control option may be used to send e-mails to a group. For instance, it may be used to send all photos of a user's child to a group that includes the user's extended family.

Example 9

A system achieves a similar result as in Example 8. A first control option allows a user to assemble all images in which a subject has been identified as a virtual photo album. The user can add or remove pictures from the virtual photo album. The user may also use filters (e.g. time filters) to reduce the number of pictures in the virtual album. A second control option allows the user to assemble all of the images in the virtual photo album in an e-mail message. The user is given the option of attaching the entire image files associated with the image to the e-mail message or only attaching reduced content image files to the e-mail message. The user may enter a single group designation in the e-mail address field, which group designation will cause the message program to send the e-mail message containing the photos to the e-mail addresses of everyone in the group.

Example 10

A portable device acquires pictures as discussed above in Example 1. In a review mode that allows a user to review pictures, the portable device includes a scrollable array of thumbnails. The review mode also displays time and location filter menus that allow a user to filter through the images stored by the portable device. The default setting for each of the filters is "all." See FIG. 5.

Example 11

A portable device acquires pictures as discussed above in Example 1. In a review mode, the portable device allows the user to create one or more virtual photo albums. The virtual photo albums automatically assemble images into the album based on filters chosen by a user. As additional images are captured by the camera which meet the filter requirements, they are added to the album. A user may add or remove images that were or were not automatically added based on the filters. The virtual photo album may be saved for later access by a user of the portable device.

Example 12

A portable device operates as discussed above in Example 11 and adds image recognition data as discussed above in Example 6. In a review mode, the portable device allows the user to create one or more virtual photo albums that use a filter relating to individuals identified in the images. The filter may be related to one person or may be related to multiple people such as a group preset by the user (e.g. a user's immediate family, a filter for high school friends of the user, etc.).

As additional images are captured by the camera which meet the filter requirements, they are added to the album. A user may add or remove images that were or were not automatically added based on the filters. The virtual photo album may be saved for later access by a user of the portable device.

Example 13

A portable device operates as discussed above in Example 6. The user is allowed to set up rules for automatically sending messages when new pictures are captured. The rules can include filters for any of the non-image data discussed above including event attendees and people identified in the image. The rules might also include that the user posted the images to a website.

If the rules are met, the system will automatically send an e-mail message to all people to whom the user pre-configured the message to be sent. The user may pre-configure the system to send a message including the full image files, reduced content image files, and/or links to where the image is posted.

The user may set rules regarding the frequency at which messages are sent based on newly captured images. For example, the rules may be set such that a message relating to new images is sent no more than once per period of time (e.g. per day), may not be sent until a predetermined number of images have been captured meeting the rule(s) (e.g. 5) or a time period (e.g. 6 hours) has elapsed, or some other criteria to reduce the frequency of messages sent.

Example 14

A system works as described in Example 13. A set of rules includes that at least two people associated with a group have been identified in the image. If the rule is met, then an e-mail message is automatically sent to every member of the group, the message containing an image file that includes a reduced size copy of the image.

Example 15

A system works as discussed above in Example 10. The system looks for clusters of dates at which the images were obtained (e.g. periods of high activity surrounded by periods of no or only light activity). If a cluster is found, the system provides a date filter option that includes a date range for the cluster of photos (see FIG. 8).

The system also provides date filter options based on month ranges (e.g. every three months).

Example 16

A system works as described above in Example 15. When the system receives a filter option input from a location filter, the system re-looks for clusters of dates but only in the image files which meet the location filter option input. The system provides cluster-based date filter options that are limited to the clusters of images meeting the location filter option that was selected.

Example 17

A system works as discussed above in Example 10. The system provides date filters that cover date ranges. The system provides more specific filters for recent date ranges (e.g. this week, this month) and less specific filters for older date ranges (e.g. grouping by year for filters covering time periods that are over a year ago). The system also provides an option for a user to manually input a date range. See FIG. 7.

Example 18

A device receives images that include non-image data. The user may input filters to be used to filter the images on the device. The combination of filters input by the user can be saved for use to filter images at a later time. The saved filter can be used to filter images saved on one or multiple remote devices.

Example 19

A system works as discussed above in Example 10. The system automatically generates location filter options that the user can use to filter images. Location filters are only automatically provided for locations covering areas where images were captured. The specificity of the primary filters (i.e. the broadest category filter menu for a subject) is based in part on how close the location where the image was captured is to the user's home and work addresses. The closer the image was taken to the user's home location, the more specific the filter options presented in the primary filter menu. See FIG. 6.

Example 20

A website receives image files containing the information discussed above in Examples 1 and 6. The website allows users to search for other photos that are similar to the user's photos (e.g. taken at roughly the same place at roughly the same time, taken at the same event, etc.). In one option, the user can input the filters to use to do identify "related" photos. As another option, the user can choose to let the website search automatically for the related files.

Example 21

A mobile device operates as discussed above for Example 1. The device does not maintain a full database of location names (e.g. map data such as country, region city, street, etc. type information). When a pictures is captured, the portable device sends the coordinates of the picture to a remote database using a cellular transceiver, and receives location name information from the remote database. The device uses the data received from the remote database to add location name data to the image file.

Example 22

A mobile device operates as discussed above for Example 1. The device does not maintain a full database of location names (e.g. map data such as country, region city, street, etc. type information). When the device is in a camera mode, the device obtains location name information for the area in which the device is located from a remote database using the cellular transceiver. The device stores this data from the remote database and uses the data received from the remote database to add location name data to an image file when an image is captured in the camera mode.

Example 23

A system works as discussed above in Example 10. The filter menu options in a single filter menu (e.g. location filter menu) include filter options at more than one level of a hierarchy (e.g. by city and by state, by city and by country, etc.). A single image may be covered by more than one of the filter options generated for a filter menu—particularly where two filter options are at different levels of a hierarchy and one of the filter options subsumes the other filter option. See FIG. 6.

Example 24

A system works as discussed above in Example 10. A primary filter menu (e.g. a primary location filter menu) provides a number of filter options. If the filter option selected in the primary menu has other filter options below it in a hierarchy, a secondary filter option menu provides the lower hierarchy filter options for selection by the user. See FIG. 9.

For example, a user may have taken a picture in Salamanca, N.Y. The user could choose New York state in the primary filter menu. Locations in New York state where the user took pictures would appear in the secondary filter menu (e.g. Salamanca, N.Y.).

Example 25

A system operates as discussed above in Example 1. A user can use the portable device to upload images to a web hosting server. When the images are uploaded, the portable device automatically generates an e-mail message to all of the event attendees with a link to the uploaded images.

Example 26

A system operates as discussed in Example 1. The device does not have any event information listed in the user's calendar. The device then looks to related calendars for information. The device has an event entry in a spouse's calendar that matches the time and location at which the image was captured. The device adds that event information to the image file.

Example 27

A system operates as discussed in Example 26. The device does not contain event information on the device. The device sends a packet of data including the time and location the image was captured to a remote database. The remote database compares the time and location information of the image to the times and locations of public events which it obtains from Internet sources. Where there is a match, the remote database sends a packet of information relating to the public event back to the device. The device then adds this information to the image file of the image.

Example 28

A system operates as discussed above in Example 27, except that no public event information is available. The remote database sends information relating to the restaurant located at the location the image was captured to the device. The device uses this restaurant information and the time information associated with the image to automatically name the image "dinner at Restaurant Name."

Example 29

A system operates as discussed for example 28. The system also detects the presence of other people of the user's buddy list during a time period before and after the image is captured. If only one or two people from the user's buddy list is present, the device automatically includes the identified people's names in the name of the image. If multiple people are present, the device adds the identified people's names to non-visible data fields of the image's file.

Example 30

A user pre-configures a list of people and associates each person with one or more devices having Bluetooth transmitters. In use, the user's device detects the presence of the other devices using a short range Bluetooth connection. The device uses the pre-configured list to identify which people from the user's list are present for a period of time preceding the time at which the image was capture and a period of time following the time at which the image was captured.

The time limits may be set by a user. In some embodiments, the time limits may be, for example, up to about 30 or 20 minutes. In some embodiments, the time limits may be shorter, such as 10 minutes or 5 minutes.

The device adds image to the image file of the image based on which other users were identified as being present when the image was captured.

Example 31

A device is tracked by a tracking service using the GPS information from the device as are a group of other people associated with the user of the device. The device accesses information from the tracking service to determine which other people were present when the image was captured and adds that information to the image file.

Example 32

Other examples use the information acquired in Examples 30 and 31 to perform the functions recited in Examples 1, 2, 5-8, 10-14, 18, and 25.

Example 33

Another exemplary embodiment is directed to a system for handling electronic photographs. The system includes a memory configured to receive image files that include data configured to identify an image, time data representative of the time at which the image was captured, and location data representative of the location at which the image was captured. The system also includes a processing circuit configured to organize images based on the time data and the location data.

Example 34

Another exemplary embodiment is directed to a handheld device. The hand-held device includes a camera configured to capture electronic images, a location circuit configured to provide data representative of a location of the handheld device, and a time circuit. The hand-held device also includes a processing circuit configured to receive data representative of an image obtained from the camera; receive data from the location circuit and, in response, generate location information representative of a location of the hand-held device when the image was captured; receive data from the time circuit and, in response, generate time information representative of the time at which the image was captured by the camera; and form an image file that includes data representative of an image obtained from the camera, the time information for the image, and the location information for the image.

Example 35

An exemplary hand-held device includes a housing that is configured to be hand-held by a user; and a processing circuit configured to receive data representative of an image captured by a camera and form an image file that includes data representative of an image captured by the camera, time data for the image, and location data for the image. The hand-held device may further include a cellular transceiver. At least a portion of the image file can be transferred using the cellular transceiver.

Other Features

Referring back to FIGS. 5-9, a system for displaying images to a user may use a preview window 400 that includes an array 406 of thumbnails 408 of images stored and/or accessible by device 10. A user may be presented with filter menus 402,404 which may be directed to a particular subject matter (location, time, etc.). If a filter menu 402,404 is selected, a plurality of corresponding filter options 414,416 may be displayed. The filter option 410,412 selected from the various filter options 414,416 can be used to filter 246 (FIG. 3) the images 406 displayed to the user. Also, the selected filter option 410,412 can be displayed to the user.

Selection of a filter option 410 from a broad filter menu 402 (a primary filter menu) can cause a more limited filter menu 418 (a secondary or subset filter menu) (e.g. covering the same subject matter as the broad filter menu 402) to be displayed (see FIG. 9). A user can select a filter option 420 in the more limited filter menu 418 to narrow the number of images 408 displayed.

One image 408 to be displayed may be selected from the array of images 406 by clicking on the image 408. The image displayed (not illustrated) may be the same image 408 as in the array 406, even though the image 408 in the array 406 may be based on the thumbnail data of the image whereas the image displayed (not illustrated) may be based on the full size data of the image stored by device 10.

Multiple screens of thumbnails and/or a scrollable set of thumbnails may be used where the number of images 408 meeting the criteria of the selected filters 410,412 exceeds the number of images 406 to be displayed at a single time.

Instead of (or in addition to) displaying thumbnails, any information associated with an image may be displayed. For example, a list of titles of images 408 may be displayed. As another example, images 408 may be listed based on the event with which they are associated, the location at which they were taken, etc.

The preview window 400 may be part of an image capturing application, may be part of an image reviewing application, may be part of a file system, may be part of an image editing application, or may be part of some other application.

Referring back to FIG. 10, a day view of a calendar application 116 includes a date bar 504 that indicates the day being viewed by the user, includes a day selection bar 502 that allows a user to select which day they would like to view. The day selection bar 502 may be any length, but is illustrated as showing a one week interval. The day view of the calendar application 116 also includes a scroll button 524 that allows a user to scroll through different day selection bars 504. For example, a user could select control option 524 to cause the calendar application 116 to display events from one week prior to the currently viewed week.

The day view can include a day schedule 522 that shows the day broken up by time of day (e.g. every hour). Events 518-520 are shown on the day schedule 522 where they occur. The end or beginning time 524 of an event 518 that does not begin or end at a regularly scheduled time 526 may be inserted into the list of times displayed by the day schedule 522. Events may include a link 528 that indicates that an event is scheduled during the period between the linked times. The link may be a bar (as illustrated), may be a block in the name field 530 of the event, or may take some other form.

Information regarding an event may include the time at which the event will begin and/or end, a description of the event in a name field 530, an icon 506 indicating whether an alarm is associated with the event, an icon 508 indicating whether an image is associated with an event, etc.

The day view of the calendar application 116 may also include a control option 512 to create a new event, a control option 514 to view details regarding a selected event 518-520, a control option 510 to go to a particular date (or, possibly, to a particular event), and a control option to switch from the day view 516 to a different view. Other views may include a calendar view for the month, a calendar view for multiple months, a week view listing events for each day of the week, a week view showing the user's general availability during the week, a combined calendar and task view (e.g for a selected day), or some other view.

Referring back to FIG. 1, portable device 10 may be a mobile computing device capable of executing software programs. The device 10 may be implemented as a combination handheld computer and mobile telephone, sometimes referred to as a smart phone. Examples of smart phones include, for example, Palm® products such as Palm® Treo™ smart phones. Although some embodiments may be described with portable device 10 implemented as a smart phone by way of example, it may be appreciated that the embodiments are not limited in this context. For example, portable device 10 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, camera, pager, messaging device, data communication device, and so forth.

Processing circuit 32 of hand-held device 10 may include one or more of a microprocessor 26, image processing circuit 16, display driver 18, NVM controller 28, audio driver 22 (e.g. D/A converter, A/D converter, an audio coder and/or decoder (codec), amplifier, etc.), and other processing circuits. Processing circuit 32 can include various types of processing circuitry, digital and/or analog, and may include one or more of a microprocessor, microcontroller, application-specific integrated circuit (ASIC), field programmable gate array (FPGA), or other circuitry configured to perform various input/output, control, analysis, and other functions. In various embodiments, the processing circuit 32 may include a central processing unit (CPU) using any suitable processor or logic device, such as a as a general purpose processor. Processing circuit 32 may include, or be implemented as, a chip multiprocessor (CMP), dedicated processor, embedded processor, media processor, input/output (I/O) processor, co-processor, a microprocessor such as a complex instruction set computer (CISC) microprocessor, a reduced instruction set computing (RISC) microprocessor, and/or a very long instruction word (VLIW) microprocessor, a processor implementing a combination of instruction sets, a controller, a microcontroller, an application specific integrated circuit (ASIC), a field programmable gate array (FPGA), a programmable logic device (PLD), or other processing device in accordance with the described embodiments.

Processing circuit 32 may be configured to digitize data, to filter data, to analyze data, to combine data, to output command signals, and/or to process data in some other manner. Processing circuit 32 may be configured to perform digital-to-analog conversion (DAC), analog-to-digital conversion (ADC), modulation, demodulation, encoding, decoding, encryption, decryption, etc. Processing circuit 32 (e.g. microprocessor 26) may be configured to execute various software programs such as application programs and system programs to provide computing and processing operations for device 10.

Processing circuit 32 may also include a memory that stores data. Processing circuit may include only one of a type of component (e.g. one microprocessor), or may contain multiple components of that type (e.g. multiple microprocessors). Processing circuit 32 could be composed of a plurality of separate circuits and discrete circuit elements. In some embodiments, processing circuit 32 will essentially comprise solid state electronic components such as a microprocessor (e.g. microcontroller). Processing circuit 32 may be mounted on a single board in a single location or may be spread throughout multiple locations which cooperate to act as processing circuit 32. In some embodiments, processing circuit 32 may be located in a single location and/or all the components of processing circuit 32 will be closely connected.

Components shown as part of a single processing circuit 32 in the figures may be parts of separate processing circuits in various embodiments covered by the claims unless limited by the claim to a single processing circuit (e.g. location circuit 24 may be part of a separate assembly having a separate microprocessor that interfaces with processing circuit 32 through data port 40).

Hand-held device 10 may also include a network transceiver 44. Transceiver 44 may operate using one or more of a LAN standard, a WLAN standard, a Bluetooth standard, a Wi-Fi standard, an Ethernet standard, and/or some other standard. Network transceiver 44 may be a wireless transceiver such as a Bluetooth transceiver and/or a wireless Ethernet transceiver. Wireless transceiver 44 may operate using an IEEE 802.11 standard. Hand-held device 10 may also include an external device connector 40 (such as a serial data port) for transferring data. External device connector 40 may also serve as the connector 54 to an external power supply. Hand-held device may contain more than one of each of transceiver 44 and external device connector 40. For example, network transceiver 44 may include both a Bluetooth and an IEEE 802.11 transceiver.

Network transceiver 44 may be arranged to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of wireless network systems offering data communication services may include the Institute of Electrical and Electronics Engineers (IEEE) 802.xx series of protocols, such as the IEEE 802.11a/b/g/n series of standard protocols and variants (sometimes referred to as "WiFi"), the IEEE 802.16 series of standard protocols and variants (sometimes referred to as "WiMAX"), the IEEE 802.20 series of standard protocols and variants, and so forth.

Hand-held device 10 may be capable of operating as a mobile phone. The mobile phone may use transceiver 44 and/or may use a cellular transceiver 36. Cellular transceiver 36 may be configured to operate as an analog transceiver, a digital transceiver (e.g. a GSM transceiver, a TDMA transceiver, a CDMA transceiver), or some other type of transceiver. Cellular transceiver 36 may be configured to transfer data (such as image files) and may be used to access the Internet 42 in addition to allowing voice communication. Cellular transceiver 36 may be configured to use one or more of an EV-technology (e.g. EV-DO, EV-DV, etc.), an EDGE technology, a WCDMA technology, and/or some other technology.

Transceiver 44 may be arranged to perform data communications in accordance with different types of shorter range wireless systems, such as a wireless personal area network (PAN) system. One example of a wireless PAN system offering data communication services includes a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), etc.—as well as one or more Bluetooth Profiles, etc. Other examples may include systems using an infrared technique.

Cellular transceiver 36 may provide voice communications functionality in accordance with different types of cellular radiotelephone systems. Examples of cellular radiotelephone systems may include Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) cellular radiotelephone systems, Extended-TDMA (E-TDMA) cellular radiotelephone systems, Narrowband Advanced Mobile Phone Service (NAMPS) cellular radiotelephone systems, third generation (3G) systems such as Wide-band CDMA (WCDMA), CDMA-2000, Universal Mobile Telephone System (UMTS) cellular radiotelephone systems compliant with the Third-Generation Partnership Project (3GPP), and so forth.

In addition to voice communications functionality, the cellular transceiver 36 may be arranged to provide data communications functionality in accordance with different types of cellular radiotelephone systems. Examples of cellular radiotelephone systems offering data communications services may include GSM with General Packet Radio Service (GPRS) systems (GSM/GPRS), CDMA/1×RTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth.

Hand-held device 10 may include one or more user input devices 31 (e.g. button, switch, touch screen, keyboard, keypad, voice command circuit, etc.) for registering commands from a user on device 10. Some or all of user input devices 31 may interface with a switch control circuit (not shown) configured to interpret which switches have been actuated. User input device 31 may include an alphanumeric keyboard. The keyboard may comprise, for example, a QWERTY key layout and an integrated number dial pad. A keyboard integrated into a hand-held device would typically be a thumb keyboard. User input device 31 may also include various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. Any of user input devices 31 may be concealable behind a body (e.g. a sliding body, a flip-out body, etc.) such that they are hidden when the body is in a first position and visible when the body is in the second position.

Hand-held device 10 may include one or more location determining circuits 24 (e.g. a GPS circuit and/or a cell-based location determining circuit) configured to determine the location of device 10. Device 10 may be configured to receive inputs from more than one location determining circuit 24. These inputs can be compared such that both are used, one (e.g. a cell-based system) can be used primarily when the other (e.g. GPS) is unable to provide reliable location information, or can have some other functional relationship.

Device 10 may use one or more different location determining techniques to derive the location of the device 10 based on the data from location determining circuit 24.

For example, device 10 may use one or more of Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFTL) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), and so forth.

Device 10 may be arranged to operate in one or more position determination modes including, for example, a standalone mode, a mobile station (MS) assisted mode, and/or a MS-based mode. In a standalone mode, such as a standalone GPS mode, the mobile computing device 100 may be arranged to autonomously determine its position without network interaction or support. When operating in an MS-assisted mode or an MS-based mode, however, device 10 may be arranged communicate over a radio access network (e.g., UMTS radio access network) with a position determination entity (PDE) such as a location proxy server (LPS) and/or a mobile positioning center (MPC).

In an MS-assisted mode, such as an MS-assisted AGPS mode, the PDE may be arranged to determine the position of the mobile computing device. In an MS-based mode, such as an MS-based AGPS mode, device 10 may be arranged to determine its position with only limited periodic assistance from the PDE. In various implementations, device 10 and the PDE may be arranged to communicate according a suitable MS-PDE protocol (e.g., MS-LPS or MS-MPC protocol) such as the TIA/EIA standard IS-801 message protocol for MS-assisted and MS-based sessions in a CDMA radiotelephone system.

When assisting device 10, the PDE may handle various processing operations and also may provide information to aid position determination. Examples of assisting information may include satellite-based measurements, terrestrial-based measurements, and/or system-based measurements such as satellite almanac information, GPS code phase measurements, ionospheric data, ephemeris data, time correction information, altitude estimates, timing offsets, forward/reverse link calibration, and so forth.

In various implementations, the assisting information provided by the PDE may improve the speed of satellite acquisition and the probability of a position fix by concentrating the search for a GPS signal and/or may improve the accuracy of position determination. Each position fix or series of position fixes may be available at device 10 and/or at the PDE depending on the position determination mode. In some cases, data calls may be made and assisting information may be sent to device 10 from the PDE for every position fix. In other cases, data calls may be made and assistance information may be sent periodically and/or as needed.

Hand-held device 10 may include one or more audio circuits 20 (e.g. speakers, microphone, etc.) for providing or receiving audio information to or from a user. In one example, hand-held device 10 includes a first speaker 20 designed for regular phone operation. Hand-held device 10 may also include a second speaker 20 for louder applications such as speaker phone operation, music or other audio playback (e.g. an mp3 player application), etc. Hand-held device 10 may also include one or more audio ports 20 (e.g. a headphone connector) for output to an external speaker and/or input from an external microphone. Audio circuit 20 may be under the control of one or more audio drivers 22 which may include D/A converters and/or an amplifier.

Hand-held device 10 may include a camera 12 for taking pictures using device 10. Camera 12 may include a CCD sensor, a CMOS sensor, or some other type of image sensor capable of obtaining an image (particularly, images sensors capable of obtaining an image formed as an array of pixels). The image sensor may have a resolution of at least about 65,000 pixels or at least about 1 megapixel. In some embodiments, the image sensor may have a resolution of at least about 4 megapixels. Camera 12 may also include read-out electronics for reading data from the image sensor. Image processing circuit 16 may be coupled to the camera 12 for processing an image obtained by the camera. This image processing may include format conversion (e.g. RGB to YCbCr), white balancing, tone correction, edge correction, red-eye reduction, compression, CFA interpolation, etc. Image processing circuit 16 may be dedicated hardware that has been optimized for performing image processing.

Hand-held device 10 may include a display 14 for displaying information to a user. Display 14 could be one or more of an LCD display (e.g. a touch-sensitive color thin-film transistor (TFT) LCD screen), an electroluminescent display, a carbon-nanotube-based display, a plasma display, an organic light emitting diode (OLED) display, and some other type of display. Display 14 may be a touch screen display such that a user may input commands by approaching (e.g. touching) display 14 (including touch screens that require a specialized device to input information). Display 14 may be a color display (e.g., 16 or more bit color display) or may be a non-color (e.g. monotone) display. Display 14 may be controlled by a display driver 18 that is under the control of a microprocessor 26. In some embodiments, display 14 may be used with a stylus. Display 14 may be used as an input to a handwriting recognizer application.

Hand-held device 10 may include a dedicated memory 34 fixed to device 10. Memory 34 may be implemented using any machine-readable or computer-readable media capable of storing data such as erasable or non-erasable memory, writeable or re-writeable memory, and so forth. Dedicated memory 34 may be a non-volatile memory, may be a volatile memory, or may include both volatile and non-volatile memories. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information. In one embodiment, fixed memory 34 is a non-volatile memory.

Although the memory 34 is shown as being separate from and external to processing circuit 32 some portion or the entire memory 34 may be included on the same integrated circuit as processing circuit 32 (e.g. the same integrated circuit as microprocessor 26).

Hand-held device 10 may include a removable memory port 38 configured to receive a removable memory medium, and/or other components. Removable memory port 38 may also serve as an external device connector 40. For example, removable memory port may be an SDIO card slot which can be used to receive memory cards, receive cards input and/or output data, and combined cards having both memory and input/output functions.

Memory 34 and/or memory 38 may be arranged to store one or more software programs to be executed by processing circuit 32.

Dedicated memory 34 and removable memory 38 may be connected to and/or under the control of a common memory controller 28 such as a non-volatile memory controller. Memory controller 28 may be configured to control reading of data to and writing of data from dedicated memory 34 and/or removable memory 38.

Handheld device 10 may be configured to connect to one or more servers 46,48 via a network 42 (such as the Internet) using one or more of network transceiver 44, cellular transceiver 36, and external device connector 40.

Hand-held device 10 may also include a power supply circuit 52 configured to regulate power supply in hand-held device 10. Power supply circuit 52 may be configured to do one or more of control charging of battery 56, to communicate the amount of power remaining in battery 56, determine and/or communicate whether an external power supply is connected, switch between the external power supply and the battery, etc. Battery 56 may be a rechargeable battery and may be removable or may be fixed to device 10. Battery 56 may be formed from any number of types of batteries including silver-based batteries (e.g. silver-zinc, magnesium-silver-chloride, etc.), a lithium-based battery (e.g. lithium-ion, lithium-polymer, etc.), a nickel-based battery (nickel-cadmium, nickel-metal-hydride, etc.), zinc-based batteries (e.g. silver-zinc, carbon-zinc, etc.), etc. External power supply connector 54 may be configured to be connected to a direct current source, an alternating current source, or both DC and AC sources.

Device 10 may have an optical viewfinder (not shown), may use display 14 as a digital viewfinder, may include some other type of view finder, may include multiple types of view finders, or may not include a view finder.

Device 10 may be configured to connect to the Internet 42, which may be a direct connection (e.g. using cellular transceiver 36, external device connector 40, or network transceiver 44) or may be an indirect connection (e.g. routed through external device 50). Device 10 may receive information from and/or provide information to the Internet. Device 10 may include a web browser configured to display information received from the Internet (including information which may be optimized by the browser for display on portable device 10). Device 10 may connect to one or more remote servers 46,48 using the Internet. Device 10 could also connect to another personal electronic device 50 by way of the Internet.

Device 10 may comprise an antenna system (not illustrated) for transmitting and/or receiving electrical signals. Each of the transceivers 36,44 and/or location circuit 24 may include individual antennas or may include a common antenna system. The antenna system may include or be implemented as one or more internal antennas and/or external antennas.

Portable device 10 may comprise a subscriber identity module (SIM) coupled to processing circuit 32. The SIM may comprise, for example, a removable or non-removable smart card arranged to encrypt voice and data transmissions and to store user-specific data for allowing a voice or data communications network to identify and authenticate the user. The SIM may store data such as personal settings specific to the user.

Referring back to FIG. 2, device 10 and/or processing circuit 32 may be configured to run any number of different types of applications. Examples of application programs may include, for example, a phone application 130 (e.g. a telephone application, a voicemail application, etc.), a messaging application 102 (e.g. an e-mail application, an instant message (IM) application, a short message service (SMS) application, a multimedia message service (MMS) application), a web browser application 128, a personal setting application 110 (e.g. a personal information manager (PIM) application), a contact management application 118, a calendar application 116 (e.g. a calendar application, a scheduling application, etc.), a task management application 122, a document application (e.g. a word processing application, a spreadsheet application, a slide application, a document viewer application, a database application, etc.), a location application 114 (e.g. a positioning application, a navigation application, etc.), an image application 112 (e.g. a camera application such as a digital camera application and/or a video camera application, an image management application, etc.) including media player applications (e.g. a video player application, an audio player application, a multimedia player application, etc.), a gaming application, a handwriting recognition application, and so forth. The application software may provide a graphical user interface (GUI) to communicate information between the portable device 10 and a user.

Device 10 may include a location application 114. Location application 114 may be configured to calculate the current position (e.g. the rough current position) of device 10 based on data received from one or more location circuits 24. Location application 114 may be provided with map information such that it can translate coordinate positions into map positions (and vice versa). Location application 114 may be configured to provide navigational information to a user such as turn by turn directions.

Device 10 may include personal organizer applications such as a calendar application 116, a contacts application 118, and a task application (not illustrated). Calendar application 116 may allow a user to schedule events, set alarms for events, and store a wide variety of information for events (e.g. name of the event, location of the event, other attendees of the event, etc.). Contacts application 118 may allow a user to save contact information for a contact such as phone number information (which may be shared with a phone application 130), address information, group information (e.g. which user created group or groups the contact belongs to), and other information about the contact. The task application allows a user to keep track of pending and/or completed tasks.

Device 10 may include an internal clock application 124 that keeps track of time information (such as current time of day and/or date), time zone information, daylight savings time information, etc. Clock application 124 may be a program running based on data from an internal clock of microprocessor 26, data from a separate clock/timing circuit, or data from some other circuit.

Device 10 may also include one or more network connection protocol applications 126 that allow a user to transfer data over one or more networks. Network application 126 may be configured to allow device 10 to access a remote device such as server 46,48.

Device 10 may include an Internet browser application 128 that allows a user to browse the internet. The Internet browser application may be configured to alter the data received from Internet sites so that the data can be easily viewed on portable device 10.

Device 10 may include a phone application 130 configured to allow a user to make phone calls. Phone application 130 may use contact information from contact application 118 to place phone calls.

Device 10 may also include one or more messaging applications 102 that allow a user to send and/or receive messages such as text messages, multi-media messages, e-mails, etc. E-mail messages may come from a server which may use a Push technology and/or may use a pull technology (e.g. POP3, IMAP, etc.).

Any of the information discussed above for any of the applications (e.g. applications 102-128) may be added to or otherwise associated with an image file.

Referring to FIGS. 1 and 11A-11F, a hand-held portable computing device 600 (e.g. smartphone) includes a number of user input devices 31. The user input devices include a send button 604 configured to select options appearing on display 603 and/or send messages, a 5-way navigator 605 configured to navigate through options appearing on display 603, a power/end button 606 configured to select options appearing on display 603 and to turn on display 603, a phone button 607 usable to access a phone application screen, a calendar button 608 usable to access a calendar application screen, a messaging button 609 usable to access a messaging application screen, an applications button 610 usable to access a screen showing available applications, a thumb keyboard 611 (which includes a phone dial pad 612 usable to dial during a phone application), a volume button 619 usable to adjust the volume of audio output of device 600, a customizable button 620 which a user may customize to perform various functions, a ringer switch 622 usable to switch the smartphone from one mode to another mode (such as switching from a normal ringer mode to a meeting ringer mode), and a touch screen display 603 usable to select control options displayed on display 603. Touch screen display 603 is also a color LCD display 14 having a TFT matrix.

Smartphone 600 also includes audio circuits 20. The audio circuits 20 include phone speaker 602 usable to listen to information in a normal phone mode, external speaker 616 louder than the phone speaker (e.g. for listening to music, for a speakerphone mode, etc.), headset jack 623 to which a user can attach an external headset which may include a speaker and/or a microphone, and microphone 625 which can be used to pick up audio information such as the user's end of a conversation during a phone call.

Smartphone 600 also includes a status indicator 601 that can be used to indicate the status of Smartphone 600 (such as messages pending, charging, low battery, etc.), a stylus slot 613 for receiving a stylus such as a stylus usable to input data on touch screen display 603, a digital camera 615 (see camera 12) usable to capture images, a mirror 614 positioned proximate camera 615 such that a user may view themselves in mirror 614 when taking a picture of themselves using camera 615, a removable battery 618 (see battery 56), and a connector 624 (see external data connector 40 and external power supply 54) which can be used to connect device 600 to either (or both) an external power supply such as a wall outlet or battery charger or an external device such as a personal computer, a gps unit, a display unit, or some other external device.

Smartphone 600 also includes an expansion slot 621 (see removable memory 38) which may be used to receive a memory card and/or a device which communicates data through slot 621, and a SIM card slot 617, located behind battery 618, configured to receive a SIM card or other card that allows the user to access a cellular network.

In various embodiments device 10 and device 600 may include a housing 640. Housing 640 could be any size, shape, and dimension. In some embodiments, housing 640 has a width 652 (shorter dimension) of no more than about 200 mm or no more than about 100 mm. According to some of these embodiments, housing 640 has a width 652 of no more than about 85 mm or no more than about 65 mm. According to some embodiments, housing 640 has a width 652 of at least about 30 mm or at least about 50 mm. According to some of these embodiments, housing 640 has a width 652 of at least about 55 mm.

In some embodiments, housing 640 has a length 654 (longer dimension) of no more than about 200 mm or no more than about 150 mm. According to some of these embodiments, housing 640 has a length 654 of no more than about 135 mm or no more than about 125 mm. According to some embodiments, housing 640 has a length 654 of at least about 70 mm or at least about 100 mm. According to some of these embodiments, housing 640 has a length 654 of at least about 110 mm.

In some embodiments, housing 640 has a thickness 650 (smallest dimension) of no more than about 150 mm or no more than about 50 mm. According to some of these embodiments, housing 640 has a thickness 650 of no more than about 30 mm or no more than about 25 mm. According to some embodiments, housing 640 has a thickness 650 of at least about 10 mm or at least about 15 mm. According to some of these embodiments, housing 640 has a thickness 650 of at least about 50 mm.

While described with regards to a hand-held device, many embodiments are usable with portable devices which are not handheld and/or with non-portable devices/systems.

The various single applications discussed above may be performed by multiple applications where more than one application performs all of the functions discussed for the application or where one application only performs some of the functions discussed for the application. For example, the image application 112 may be divided into an image capturing application and a separate image viewing application. Also, more than one application may be included on device 10 that is capable of displaying images as described for image application 112.

Further, while shown as separate applications above, many of the above listed applications can be combined into single applications that perform all or some of the functions listed for more than one of the applications discussed above.

While some components in FIG. 1 were discussed as being singular and others were discussed as being plural, the invention is not limited to devices having these same numbers of each type of component. Embodiments are conceived where each combination of plural and singular components exist.

While much of the discussion was directed at still photographs, this discussion is equally applicable to other types of media such as movies and sound recordings. For example, device 10 can be used to add additional data (metadata) to sound recording files, and can use the filters to sort through sound recording files. In some embodiments, the filters may cause multiple types of media files to be grouped based on the filters (such as all movies, sound recordings, and photographs taken at a selected event). As another example, instead of identifying objects 212 using image recognition, people, places, events, or other things associated with a movie or other sound recording could be identified 212 using sound (e.g. voice) pattern recognition.

Additionally, much of the disclosure need not be limited to media files. As one example, metadata similar to the metadata applied to media files created by the device 10 can also be applied to other data files. For instance, location and/or time information can be applied to a note file. As a second example, any file having time information may be accessed from a calendar application. Thus, selecting a command (e.g. icon) associated with an event in a calendar application may allow a user to access any number of files created or received around the time of the event, such as notes, drawings, photographs, games, songs, movies, etc.

An image that is essentially the same image will be considered the same image for purpose of the claim unless the claim recites that one image is identical to a previously recited image. An "altered image" for purposes of the claim is an image that has been altered beyond the point of being essentially the same image as before the alteration.

While discussion is made with respect to organizing image files based on an input from a calendar application, it is within the scope of the patent that image files may be organized based on inputs from each (and combinations of each) of the applications shown in FIG. 2.

In some embodiments, the various components shown in FIG. 1 may be combined in a single component. For example, in some embodiments, removable memory 38 may also be an external device connector 40 (such as an SDIO card slot which can be used to receive memory cards, input and/or output data, and combined devices having both memory and input/output functions). As another example, in some embodiments, a single connector could serve as both an external device connector 40 and as a connection to an external power supply 54.

Also, in some embodiments, the function of various claim components shown in FIG. 1 may be performed by a combination of distinct electrical components. For instance, a location circuit 24 may have a separate microprocessor that works in combination with the main microprocessor 26 of the system to perform the functions of the processing circuit 32. As another example, image processing circuit 16 may make use of the electronics of camera 12 to perform image processing, while also having other, discrete electronic components.

It is contemplated that in many of the embodiments (although not all) recited in the claims below that recite processing an image file, such processing comprises processing other than adding non-image data to the image file.

While much of the discussion was directed to an image application, the various features of the image application are equally applicable to other applications. For example, an e-mail application may use filters similar to those discussed above to sort through files (e.g. media files) for attachment to the e-mail. Filters can be used in almost any application running on device 10 (e.g. generated by any application executed by processing circuit 32 which may include image application 112). As another example, data might be added to a file (including an image file) by a non-image application.

Every reference in the disclosure above relating to time and time information can be considered a reference to date information, time of day information, and combinations of these types of time information.

For every reference above to displaying an image, the reference could also be to displaying data associated with the image. Data associated with the image could be image data or could be non-image data such as a name assigned to the image/image file.

A number of references have been made to transmitters, receivers, and/or transceivers. Each reference to a transmitter or receiver is equally applicable to a transceiver. Reference in the claim to a transmitter or receiver is also a reference to a transceiver unless it is explicitly stated that the claim is referencing an independent transmitter or receiver. Reference to functions achieved by a transceiver above could also be accomplished by combining an independent transmitter and receiver. Reference in the claims to a transceiver can also be a reference to a transmitter-receiver combination unless reference is made in the claim to a unitary transceiver.

A "time period" as discussed above could be any time period, such as a date range, an hour range, a series of these ranges, etc. A filter for a time period may filter based on date, based on time of day, based on a combination of date and time of day, etc.

A geographic area as discussed above could be based on a common geographic boundary (national boundaries, city boundaries, other regional boundaries, etc.), could be based on distance from a point, could be based on fitting within a window, etc. A larger geographic area is a geographic area that covers more area as defined by longitudinal and latitudinal points.

What is claimed is:

1. A method of processing images captured by a mobile computing device, the method performed by one or more processors of the mobile computing device and comprising:
   associating each respective image of a number of images captured by the mobile computing device with a time at which the respective image was captured, and with a location at which the respective image was captured, the location determined by accessing a location application of the mobile computing device;
   accessing a calendar application of the mobile computing device to identify an event entry corresponding to an event during the same time and having the same location as the respective image,
   wherein accessing the calendar application of the mobile computing device to identify the event entry corresponding to the event further comprises:
   selecting a number of event entries in the calendar application;
   assigning a priority to each of the selected number of event entries based, at least in part, on a closeness of a time and a location of the event entry to the time and location, respectively, at which the respective image was captured, wherein the priorities define a hierarchy of the selected number of event entries; and
   selecting the event entry having the highest priority as the identified event entry;
   associating the respective image with the identified event entry in the calendar application,
   wherein the location and the time associated with the respective image remain unchanged;
   generating an icon on the identified event entry in the calendar application indicating that one or more images were captured at the event; and
   in response to receiving a user selection of the icon, displaying the respective image on a display of the mobile computing device.

2. The method of claim 1, further comprising:
   storing, in a virtual album of the event, a plurality of images, including the respective image, captured by the mobile computing device at the event; and
   in response to receiving the user selection of the icon, presenting the virtual album of the event on the display.

3. The method of claim 2, further comprising:
   identifying one or more individuals in the plurality of images, captured by the mobile computing device at the event, using an image recognition program of the mobile computing device.

4. The method of claim 3, further comprising:
   accessing a contacts application of the mobile computing device to identify a contact entry corresponding to a respective one of the one or more identified individuals in the respective image;
   associating the respective image with the contact entry;
   generating the icon on the contact entry to indicate that one or more images of the respective individual are stored in the mobile computing device; and
   in response to a user selection of the icon on the contact entry, displaying the respective image on the display.

5. The method of claim 4, further comprising:
   storing, in a virtual album of the respective individual, a plurality of images of the respective individual, including the respective image, captured by the mobile computing device; and
   in response to receiving the user selection of the icon on the contact entry, presenting the virtual album of the respective individual on the display.

6. The method of claim 5, further comprising:
   initiating a messaging application to construct a message with an attachment corresponding to the virtual album of the event.

7. The method of claim 6, further comprising:
   presenting an option, on the display, to send the constructed message to the respective individual.

8. The method of claim 6, wherein each of the one or more identified individuals is associated with a respective contact entry of the contacts application, the method further comprising:
   presenting an option, on the display, to send the constructed message to each of the one or more identified individuals.

9. The method of claim 1, further comprising:
   displaying a map on the display;
   presenting the icon on a map-point on the map, corresponding to the location at which the respective image was captured, to indicate that one or more images were captured by the mobile computing device at the location; and
   in response to a user selection of the icon on the map-point, displaying the respective image on the display.

10. The method of claim 9, further comprising:
    storing, in a virtual album, a plurality of images associated with the location and the respective image captured by the mobile computing device; and
    in response to receiving the user selection of the icon on the map-point, presenting the virtual album on the display.

11. A mobile computing device comprising:
    a display;
    one or more processors; and
    one or more memory resources storing instructions for processing images captured by the mobile computing device, wherein the instructions, when executed by the one or more processors, cause the mobile computing device to perform operations comprising:
    associating each respective image of a number of images captured by the mobile computing device with a time at which the respective image was captured, and with a location at which the respective image was captured, the location determined by accessing a location application of the mobile computing device;
    accessing a calendar application of the mobile computing device to identify an event entry corresponding to an event during the same time and having the same location as the respective image,
    wherein accessing the calendar application of the mobile computing device to identify the event entry corresponding to the event further comprises:
    selecting a number of event entries in the calendar application;
    assigning a priority to each of the selected number of event entries based, at least in part, on a closeness of a time and a location of the event entry to the time and location, respectively, at which the respective image was captured, wherein the priorities define a hierarchy of the selected number of event entries; and
    selecting the event entry having the highest priority as the identified event entry;
    associating the respective image with the identified event entry in the calendar application, wherein the location and the time associated with the respective image remain unchanged;

generating an icon on the identified event entry in the calendar application indicating that one or more images were captured at the event; and in response to receiving a user selection of the icon, displaying the respective image on a display of the mobile computing device.

12. The mobile computing device of claim 11, wherein execution of the instructions causes the mobile computing device to perform operations further comprising:

storing, in a virtual album of the event, a plurality of images, including the respective image, captured by the mobile computing device at the event; and in response to receiving the user selection of the icon, presenting the virtual album of the event on the display.

13. The mobile computing device of claim 12, wherein execution of the instructions causes the mobile computing device to perform operations further comprising:

identifying one or more individuals in the plurality of images, captured by the mobile computing device at the event, using an image recognition program of the mobile computing device.

14. The mobile computing device of claim 13, wherein execution of the instructions causes the mobile computing device to perform operations further comprising:

accessing a contacts application of the mobile computing device to identify a contact entry corresponding to a respective one of the one or more identified individuals in the respective image;

associating the respective image with the contact entry;

generating the icon on the contact entry to indicate that one or more images of the respective individual are stored in the mobile computing device; and in response to a user selection of the icon on the contact entry, displaying the respective image on the display.

15. The mobile computing device of claim 14, wherein execution of the instructions causes the mobile computing device to perform operations further comprising:

storing, in a virtual album of the respective individual, a plurality of images of the respective individual, including the respective image, captured by the mobile computing device; and in response to receiving the user selection of the icon on the contact entry, presenting the virtual album of the respective individual on the display.

16. The mobile computing device of claim 15, wherein execution of the instructions causes the mobile computing device to perform operations further comprising:

initiating a messaging application to construct a message with an attachment corresponding to the virtual album of the event.

17. The mobile computing device of claim 16, wherein execution of the instructions causes the mobile computing device to perform operations further comprising:

presenting an option, on the display, to send the constructed message to the respective individual.

18. The mobile computing device of claim 16, wherein each of the one or more identified individuals is associated with a respective contact entry of the contacts application, and wherein execution of the instructions causes the mobile computing device to perform operations further comprising:

presenting an option, on the display, to send the constructed message to each of the one or more identified individuals.

19. The mobile computing device of claim 11, wherein execution of the instructions causes the mobile computing device to perform operations further comprising:

displaying a map on the display; and presenting the icon on a map-point on the map, corresponding to the location at which the respective image was captured, to indicate that one or more images were captured by the mobile computing device at the location; and in response to a user selection of the icon on the map-point, displaying the respective image on the display.

20. The mobile computing device of claim 19, wherein execution of the instructions causes the mobile computing device to perform operations further comprising:

storing, in a virtual album, a plurality of images associated with the location and the respective image captured by the mobile computing device; and in response to receiving the user selection of the icon on the map-point, presenting the virtual album on the display.

21. A non-transitory computer-readable medium storing instructions for processing images captured by a mobile computing device, wherein the instructions, when executed by one or more processors of the mobile computing device, cause the mobile computing device to perform operations comprising:

associating each respective image of a number of images captured by the mobile computing device with a time at which the respective image was captured, and with a location at which the respective image was captured, the location determined by accessing a location application of the mobile computing device;

accessing a calendar application of the mobile computing device to identify an event entry corresponding to an event during the same time and having the same location as the respective image, wherein accessing the calendar application of the mobile computing device to identify the event entry corresponding to the event further comprises:

selecting a number of event entries in the calendar application;

assigning a priority to each of the selected number of event entries based, at least in part, on a closeness of a time and a location of the event entry to the time and location, respectively, at which the respective image was captured, wherein the priorities define a hierarchy of the selected number of event entries; and selecting the event entry having the highest priority as the identified event entry;

associating the respective image with the identified event entry in the calendar application, wherein the location and the time associated with the respective image remain unchanged;

generating an icon on the identified event entry in the calendar application indicating that one or more images were captured at the event; and in response to receiving a user selection of the icon, displaying the respective image on a display of the mobile computing device.

22. The non-transitory computer-readable medium of claim 21, wherein execution of the instructions causes the mobile computing device to perform operations further comprising:

storing, in a virtual album of the event, a plurality of images, including the respective image, captured by the mobile computing device at the event; and in response to receiving the user selection of the icon, presenting the virtual album of the event on the display.

23. The non-transitory computer-readable medium of claim 22, wherein execution of the instructions causes the mobile computing device to perform operations further comprising:
identifying one or more individuals in the plurality of images, captured by the mobile computing device at the event, using an image recognition program of the mobile computing device.

24. The non-transitory computer-readable medium of claim 23, wherein execution of the instructions causes the mobile computing device to perform operations further comprising:
accessing a contacts application of the mobile computing device to identify a contact entry corresponding to a respective one of the one or more identified individuals in the respective image;
associating the respective image with the contact entry;
generating the icon on the contact entry to indicate that one or more images of the respective individual are stored in the mobile computing device; and
in response to a user selection of the icon on the contact entry, displaying the respective image on the display.

25. The non-transitory computer-readable medium of claim 24, wherein execution of the instructions causes the mobile computing device to perform operations further comprising:
storing, in a virtual album of the respective individual, a plurality of images of the respective individual, including the respective image, captured by the mobile computing device; and
in response to receiving the user selection of the icon on the contact entry, presenting the virtual album of the respective individual on the display.

26. The non-transitory computer-readable medium of claim 25, wherein execution of the instructions causes the mobile computing device to perform operations further comprising:
initiating a messaging application to construct a message with an attachment corresponding to the virtual album of the event.

27. The non-transitory computer-readable medium of claim 26, wherein execution of the instructions causes the mobile computing device to perform operations further comprising:
presenting an option, on the display, to send the constructed message to the respective individual.

28. The non-transitory computer-readable medium of claim 26, wherein each of the one or more identified individuals is associated with a respective contact entry of the contacts application, and wherein execution of the instructions causes the mobile computing device to perform operations further comprising:
presenting an option, on the display, to send the constructed message to each of the one or more identified individuals.

29. The non-transitory computer-readable medium of claim 21, wherein execution of the instructions causes the mobile computing device to perform operations further comprising:
displaying a map on the display;
presenting the icon on a map-point on the map, corresponding to the location at which the respective image was captured, to indicate that one or more images were captured by the mobile computing device at the location; and
in response to a user selection of the icon on the map-point, displaying the respective image on the display.

30. The non-transitory computer-readable medium of claim 29, wherein execution of the instructions causes the mobile computing device to perform operations further comprising:
storing, in a virtual album, a plurality of images associated with the location and the respective image captured by the mobile computing device; and
in response to receiving the user selection of the icon on the map-point, presenting the virtual album on the display.

\* \* \* \* \*